United States Patent
Agrawal et al.

(10) Patent No.: US 12,052,375 B2
(45) Date of Patent: Jul. 30, 2024

(54) HIDING PROOF-OF-SPACE IN BLOCKCHAIN SYSTEMS

(71) Applicant: Western Digital Technologies, Inc., San Jose, CA (US)

(72) Inventors: Shashank Agrawal, Fremont, CA (US); Cyril Guyot, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 281 days.

(21) Appl. No.: 17/714,886

(22) Filed: Apr. 6, 2022

(65) Prior Publication Data
US 2023/0327890 A1 Oct. 12, 2023

(51) Int. Cl.
*H04L 9/32* (2006.01)
*H04L 9/00* (2022.01)

(52) U.S. Cl.
CPC .............. *H04L 9/3271* (2013.01); *H04L 9/50* (2022.05)

(58) Field of Classification Search
CPC ....... H04L 9/50; H04L 9/3271; H04L 9/0643; H04L 9/0637; H04L 9/3218
USPC ......................................................... 713/168
See application file for complete search history.

(56) References Cited

U.S. PATENT DOCUMENTS

| | | | | |
|---|---|---|---|---|
| 11,507,569 B2* | 11/2022 | Cohen | ................. | G06F 16/2379 |
| 11,657,040 B2* | 5/2023 | Yang | ................... | G06F 16/2379 |
| | | | | 707/703 |
| 2008/0000969 A1* | 1/2008 | Salomonsen | ......... | H04L 9/3218 |
| | | | | 235/386 |
| 2018/0109541 A1* | 4/2018 | Gleichauf | ............. | H04W 12/06 |
| 2019/0324995 A1* | 10/2019 | Jakobsson | ................ | H04L 9/50 |
| 2020/0193425 A1* | 6/2020 | Ferenczi | ............... | H04L 9/3218 |
| 2020/0322128 A1* | 10/2020 | Hu | ............................ | G06F 9/54 |
| 2021/0271667 A1* | 9/2021 | Cohen | ................... | H04L 9/3247 |
| 2021/0279293 A1* | 9/2021 | Jakobsson | ............. | H04L 9/3239 |
| 2022/0103344 A1* | 3/2022 | Snow | ........................ | A61J 1/05 |
| 2023/0198770 A1* | 6/2023 | Agrawal | ............. | G06F 16/2246 |
| | | | | 726/22 |
| 2023/0412359 A1* | 12/2023 | Leker | .................... | H04L 9/3218 |

* cited by examiner

*Primary Examiner* — Sargon N Nano
(74) *Attorney, Agent, or Firm* — Ravi Mohan; Rutan & Tucker, LLP

(57) ABSTRACT

Blockchain systems operate over a network of computing devices. Proof-of-space blockchain consensus systems utilize data (called plots) stored in storage devices across the computing devices within the network. These storage devices are utilized to generate and store proof-of-space consensus data. This data is then accessed at a later time to respond to challenges issued across the blockchain network. The owner of a plot may wish to sell a plot to another miner. If the seller is a bad-faith actor, they may retain copies of the secret key(s) and use them to continue mining the plot along with the buyer. To prevent these attacks, it may be desirable to submit a challenge response block where the proof-of-space is not visible as part of the challenge response. This may be done by replacing the proof-of-space with a proof-of-knowledge.

12 Claims, 19 Drawing Sheets

HIDING PROOF-OF-SPACE IN BLOCKCHAIN SYSTEMS

FIELD

The present disclosure relates to storage systems. More particularly, the present disclosure relates to improving the security of transferring blockchain plots from one owner to another in systems utilized for proof-of-space blockchain applications.

BACKGROUND

Storage devices are ubiquitous within computing systems. Recently, solid-state storage devices (SSDs) have become used alongside traditional magnetic storage drives. These nonvolatile storage devices can communicate and utilize various protocols, including nonvolatile memory express (NVMe) and peripheral component interconnect express (PCIe) to reduce processing overhead and increase efficiency.

Increasingly, these storage devices are being used within blockchain systems. Blockchain miners operate computing systems that are interconnected over a network such as the Internet and share duplicate copies of a ledger that comprises a series of data blocks that each link back to the previous block. This distributed ledger system allows for the processing of decentralized data, including cryptocurrencies. By utilizing various cryptographic methods on data structures shared around the network, the decentralized network can securely process data that can be relied upon for various transactions between parties. The main requirement for this to work is for the various blockchain miners on the network to all agree on using the same blockchain data. This agreement can be done through a consensus method.

Historically, the consensus method in blockchain applications was a "proof-of-work" consensus method. Proof-of-work requires that a mining computer on the blockchain network solve a series of proposed computational problems. These problems are distributed to all of the miners on the network through a challenge format. By solving the challenge, the mining computer could propose the next block to be added to the blockchain and, as a reward, be issued some portion of the cryptocurrency associated with the blockchain. However, the proof-of-work consensus model has drawn criticism for the effects it has on the environment and the effects it has on the market for computational hardware necessary to solve the challenges.

As a result, a "proof-of-space" consensus method was proposed that utilizes storage space instead of computational power. Broadly, proof-of-space consensus involves generating and storing blockchain data on your storage device, receiving a challenge, generating an answer to that challenge utilizing the data, and providing the answer to the blockchain network for verification. The structure of the stored data and how it is processed can lead to awarding rewards in a more lottery fashion instead of awarding them to a user who has the most processing power.

However, as the blockchain system increases in size and the blockchain rewards increase in value, there becomes more incentive for a bad-faith miner to try and circumvent the system. This can be done by the bad-faith miner selling a plot to another miner while retaining the secret keys to the plot and thus, unfairly competing for the rewards associated with that block.

BRIEF DESCRIPTION OF DRAWINGS

The above and other aspects, features, and advantages of several embodiments of the present disclosure will be more apparent from the following description as presented in conjunction with the following several figures of the drawings.

Figure 1:
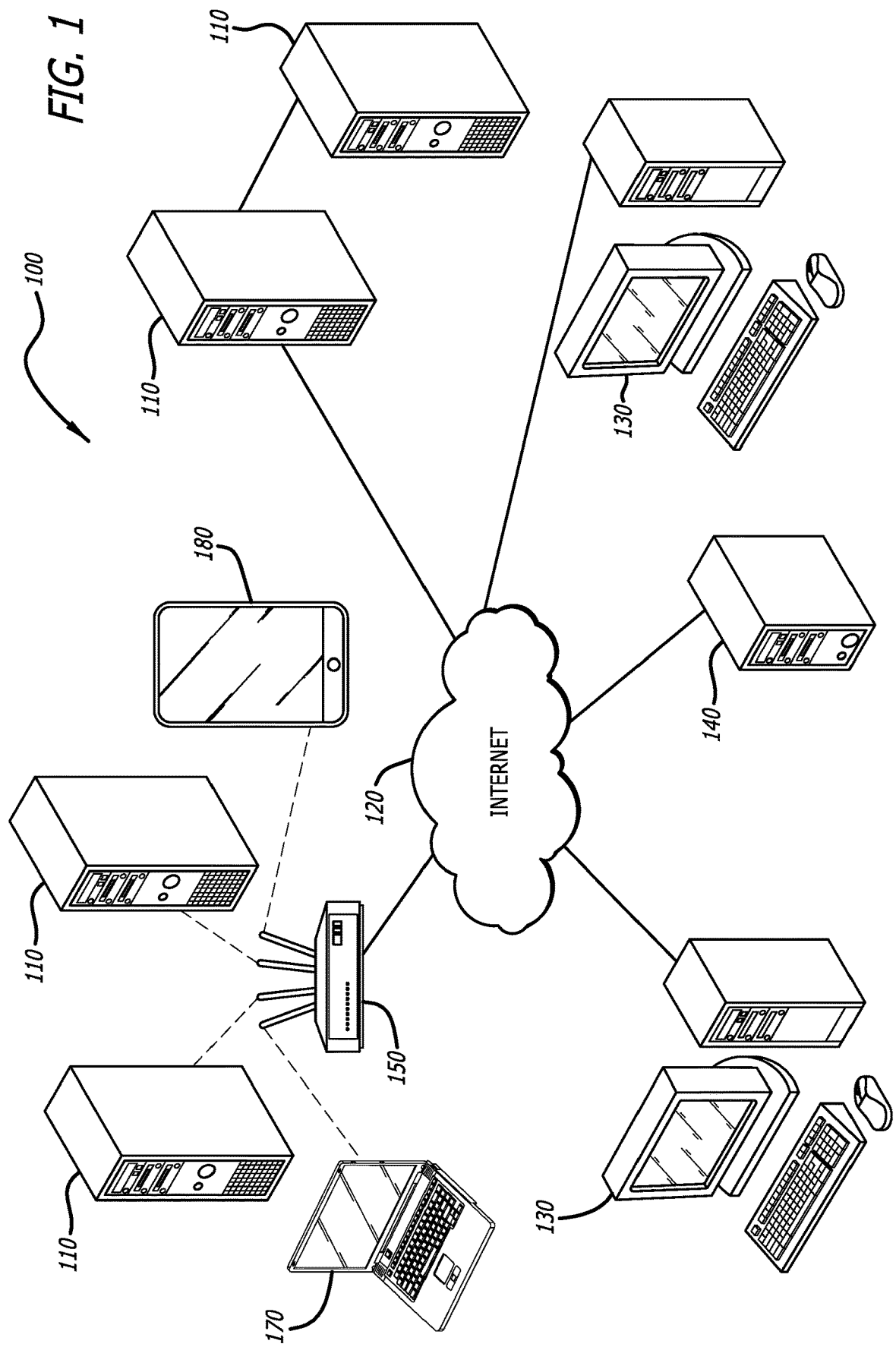
FIG. 1 is a conceptual diagram of a proof-of-space consensus blockchain network in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common but well-understood elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that provide more robust filtering and security measures for proof-of-space consensus blockchain networks. More specifically, many embodiments attempt to generate additional data that is embedded within the stored data. Once stored, this additional data is registered with the blockchain for later verification that the data was stored on the miner's storage device in the past. This verification can be done through various cryptographic methods and processing of the additional data, including providing a Merkle tree path of various values.

In a number of embodiments, users or miners may desire to utilize storage devices for a proof-of-space mining operation. One such proof-of-space-based blockchain network is called Chia. Chia cryptocurrency utilizes proof-of-space consensus methods to generate new blocks within its blockchain. This proof-of-space data for Chia is called a "plot." Chia plots are typically generated through a "plotting" process which requires a lot of read and write cycles within the memory devices of a storage device. Once generated, however, the completed plot only needs occasional access for challenge responses. This completed plot data can be stored in a long-term storage partition which may be configured to only be written to once or a few times.

In a variety of embodiments, the plotting process will include additional steps to make the future filtering and verification processes more robust against attacks and/or bad-faith miners. In particular, Chia plots are associated with pools. In some embodiments, a pool may be a personal pool containing only the miner's plots, while in other embodiments, it may be a shared pool comprising plots from many different miners and sharing the rewards among the pool members.

In some cases, the owner of a plot may wish to sell one or more of their plots to another miner. This could be because the seller is no longer interested in Chia mining and wishes to dispose of their existing plots. Alternatively, a seller may be in the business of generating plots and selling them. In either case, the seller knows the secret key(s) associated with the creation and utilization of the plot, and transferring those key(s) is one of the deliverables when selling the plot. If the seller is a bad-faith actor, they may retain copies of the secret key(s) and use them to continue mining the plot along with the buyer.

Rewards are earned by submitting a response to a challenge from the blockchain network. The response incudes a proof-of-space for the plot being used to respond to the challenge. The consensus nature of the blockchain means that all challenges are public. In the case of a bad-faith actor who has sold a plot to a miner and has kept the secret key(s), the bad faith actor can copy the challenge response block, steal the buyer's proof-of-space, and submit a competing block to the network while no longer devoting the necessary storage space to the plot. This sort of exploit is known as a "front-running attack."

To prevent these attacks, it may be desirable to submit a challenge response block where the proof-of-space is not visible as part of the challenge response block, and there is no way for the bad-faith actor to steal it and unfairly compete for the rewards of a block they no longer own. This may be done by replacing the proof-of-space with a proof-of-knowledge generated by zero-knowledge-proof hardware and/or software. In this manner, the network can verify that the miner who submits the challenge response block has a valid proof-of-space solution to the challenge without exposing that proof to a bad-faith actor.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like), or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations, which, when joined logically together, comprise the function and achieve the stated purpose for the function.

Indeed, a function of executable code may include a single instruction or many instructions and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer-readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a system diagram of a proof-of-space consensus blockchain system 100 in accordance with an embodiment of the invention is shown. The proof-of-space consensus blockchain system 100 comprises a series of nodes. For example, in the Chia blockchain network, the nodes include farmers and timelords. These nodes transmit and receive data related to the proof-of-space consensus blockchain across various networks such as the Internet 120. While embodiments of the present disclosure may encompass any viable proof-of-space blockchain system, the embodiments described throughout the figures will be related to the Chia blockchain network. Therefore, it should be understood that certain embodiments described herein can be applied to other non-Chia networks as needed.

In many embodiments, various Chia node servers 110 are connected to the Internet 120 and each other. These Chia node servers 110 may communicate and transmit Chia blockchain data between each other. In addition, there may be additional types of devices that may act as farmers and/or timelords. Personal computers may have applications that act as personal computer Chia nodes 130 that are also connected to and communicate with the other Chia nodes. In some instances, a specialized device may be connected to the network that acts as a Chia timelord 140, which typically assists in validation processes.

Furthermore, connection to the network via nodes can be made wirelessly through one or more wireless access points 150, which may connect a variety of devices including more Chia node servers, portable Chia node servers 170, or personal electronic device Chia servers 180. It should be recognized by those skilled in the art that Chia node devices may come in any available form factor and that the minimum requirements are that a processor, network connection, and storage space for completed plots be present. While it is most profitable to remain connected to the proof-of-space consensus blockchain system 100 at all times, it should be understood that node devices may leave or connect intermittently, temporarily, or permanently.

Figure 2:
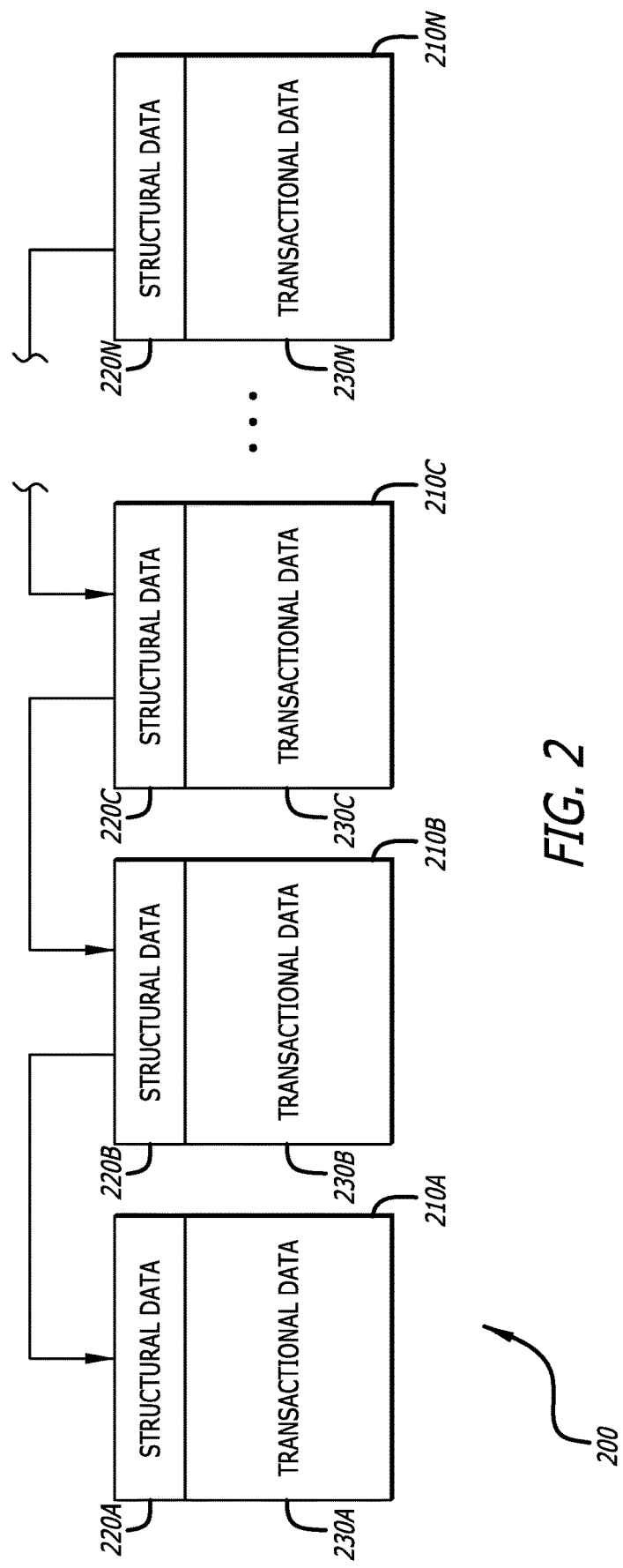
FIG. 2 is a conceptual block diagram of a blockchain.

Referring to FIG. 2, a conceptual block diagram of a blockchain 200 is shown. A blockchain 200 can be understood as a growing list of blocks that comprise records or other data. These blocks are linked together through various methods that typically involve cryptography. In many instances, each block 210A-210N (with the exception of the first, or genesis, block 210A) will comprise structural data 220A-220N, including a hash related to the previous block, a timestamp, and some sort of transactional data 230A-230N.

Because each non-genesis block 210B-210N refers back to the previous block, the blockchain 200 itself becomes tamper-resistant. A network of computing devices acting as nodes each keeps a copy of this blockchain 200 on their systems as a distributed ledger. This structure keeps blockchain ledgers from having a centralized controller and are thus decentralized. Thus, they have grown in popularity over the past decade and have been applied to a variety of applications such as cryptocurrency.

A major issue with blockchain systems is how the nodes all agree on what the next block in the blockchain should be. This issue is called "consensus" and can be solved in a number of ways. For example, Bitcoin utilizes blockchains and utilizes a "proof-of-work" consensus method. This method involves a lot of computational power from CPUs and GPUs of the various nodes. Another emerging consensus method is a "proof-of-space" method which, instead of utilizing computations to solve challenge problems, storage space is required to prove that data has been held by the node. This data is called proof-of-space data and can be generated within a storage device. Discussion of this process in more detail is outlined below.

Figure 3A:
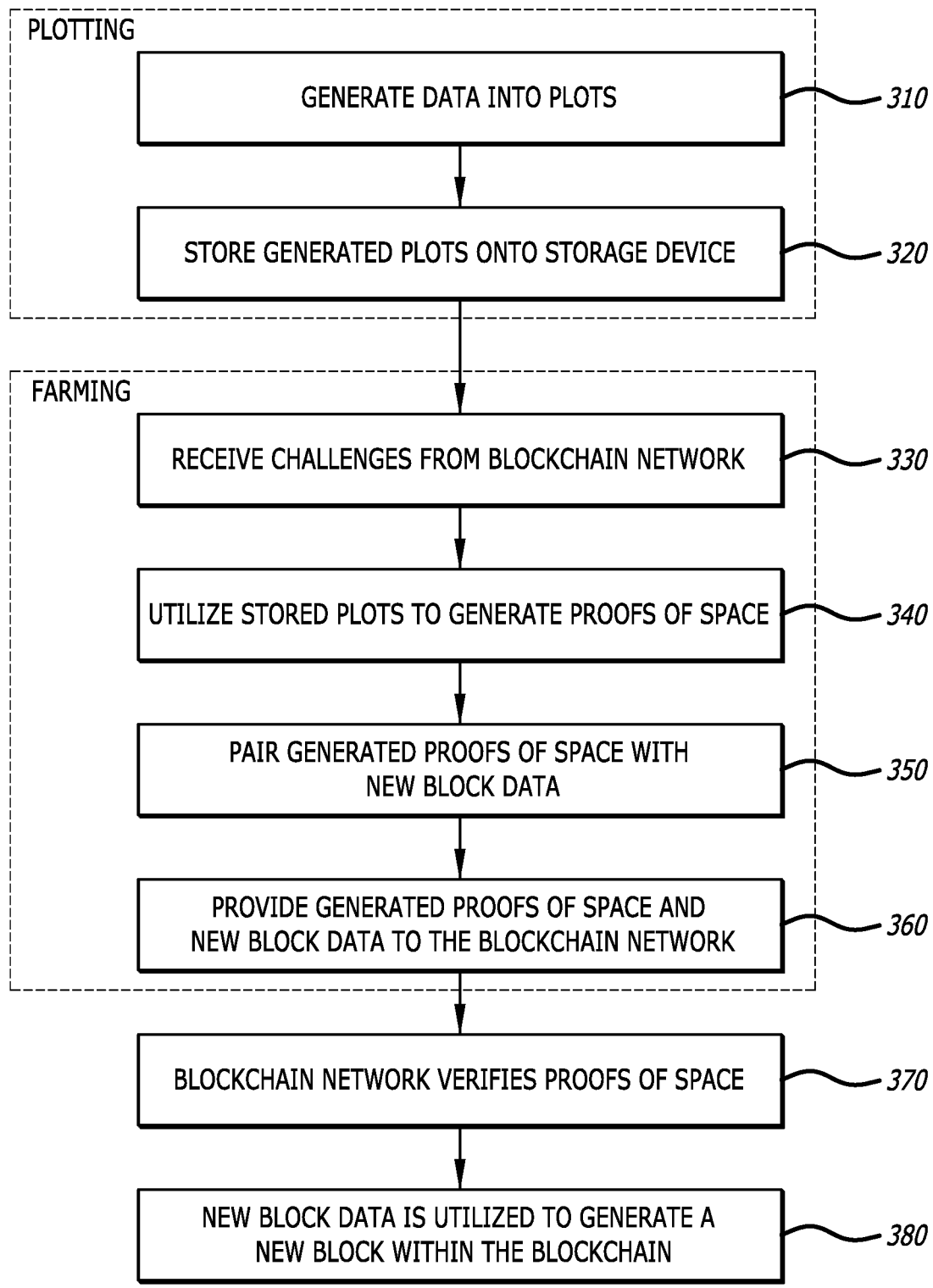
FIG. 3A is a flowchart depicting a process for mining cryptocurrency utilizing a proof-of-space consensus method in accordance with an embodiment of the disclosure.

Referring to FIG. 3A, a flowchart depicting a process 300A for mining cryptocurrency utilizing a proof-of-space consensus method in accordance with an embodiment of the disclosure is shown. As discussed above, the mining of cryptocurrency can come in many forms. In a growing number of applications, a cryptocurrency that uses a consensus method of proof-of-space can be utilized as an alternative to the currently more popular proof-of-work method. One example of a blockchain-based cryptocurrency that utilizes proof-of-space as a consensus method is Chia. Chia is centered on creating (i.e., "plotting") large quantities of proof-of-space consensus data that is formatted into one or more "plots." These plots are then stored on a hard drive for future access by the online Chia blockchain network. The plots comprise a series of hashed tables that may be accessed by the Chia network in response to a challenge posed by the network. This process of storing the plots and providing them to the online Chia network for challenge processing is called "farming."

In a typical proof-of-space blockchain process 300A the plotting stage can begin by generating data into plots (block 310). Although Chia utilizes plots, some embodiments may be able to be formatted for use within other proof-of-space-based blockchain-based systems. In many embodiments, the generation of plot data involves the creation of a plurality of tables comprising cryptographic hashes that may be nested, self-referential, or otherwise related. In various embodiments, the hashes are created through a back propagation method and are then sorted and compressed throughout the tables. The plots are completed and stored onto a storage device (block 320). This generation of plots creates a lot of input and output processes within the storage device and benefits from high-speed storage devices. This results in many users utilizing SSDs for plotting operations. However, the nature of many SSDs and their finite endurance leads to many users copying the generated plots to a secondary storage device that is more configured for long-term storage.

The farming stage of the proof-of-space consensus blockchain system comprises all of the remaining steps on the blockchain node. Farming can begin by receiving one or more challenges from the blockchain network (block 330). The exact type of challenge may vary based on the cryptocurrency process used. For example, the challenge may be a problem that must be solved within a certain time and/or in a particular format. The process 300A can utilize the stored plots to generate proofs-of-space (block 340). This step is described in more detail within the discussion of FIG. 3B. These proofs-of-space are required of the challenge answers that allow the user to attempt to add their contribution to the blockchain and reap a reward. In a variety of embodiments, the generated proofs-of-space are paired with new block data (block 350). New block data can include a proposed data block to add to the blockchain. Those skilled in the art will understand that this new block data may be comprised of sub-blocks or any other proposed block data as required by the blockchain being utilized.

The paired proofs-of-space and new block data are transmitted onto the blockchain network (block 360). The transmitted data is not automatically added to the blockchain but needs to satisfy one or more requirements as more than one user on the network may have submitted a valid proof to the challenge. During the selection of a potential new block, the blockchain network will verify the submitted proofs-of-space (block 370). This can be done in a variety of ways, depending on the exact blockchain used. Once the blockchain network has settled on a particular block candidate that was submitted, the new block data is utilized to generate a new block within the blockchain (block 380).

Figure 3B:
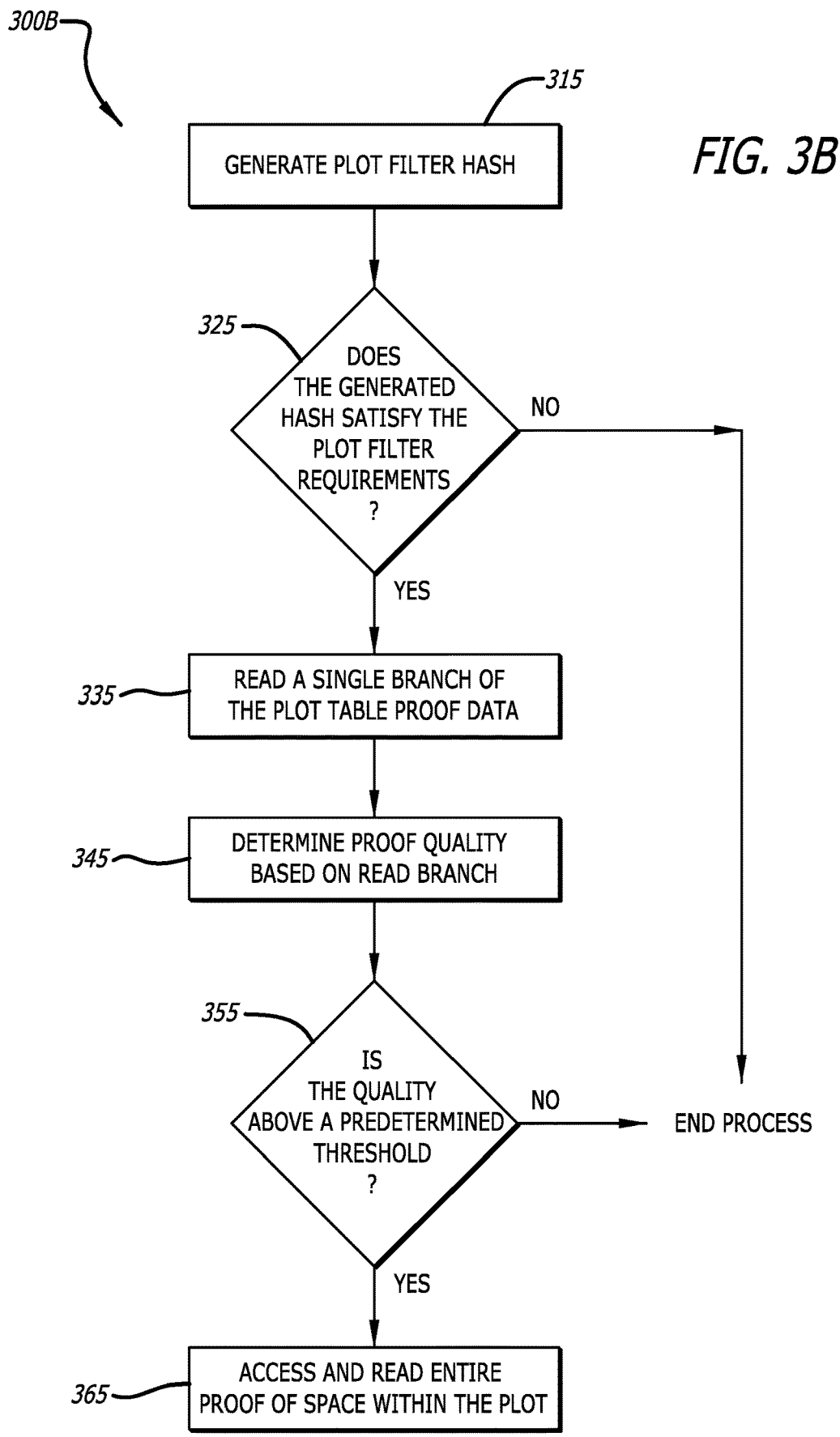
FIG. 3B is a flowchart depicting a process for filtering and qualifying proofs-of-space in accordance with an embodiment of the disclosure.

Referring to FIG. 3B, a flowchart depicting a process 300B for filtering and qualifying proofs-of-space in accordance with an embodiment of the disclosure is shown. As an example of how proofs-of-space are generated, the embodiment in FIG. 3B depicts how a proof-of-space is generated in the Chia blockchain. The proof-of-space data in Chia is called a "plot" and is a stored series of related tables of data values. The Chia node device generates this plot and stores it within a storage device. To identify each plot, a unique plot identification number is generated. This plot identification number can be generated through various means, including, but not limited to, hashing a public pool key and a private pool key.

Additionally, the blockchain network will issue challenges in the form of challenge data to the nodes. These challenges will create a race for the various nodes to generate a solution to the challenge. A node that generates a viable solution will add a proposed next block of data to the blockchain and transmit both to the rest of the nodes on the blockchain network. If the proposed solution is accepted, the proposed new block will be added to the blockchain. The administrator of the winning node will then be rewarded for this by being issued some amount of cryptocurrency from the blockchain. In the Chia network, the winning node is issued Chia currency.

Within the Chia blockchain network, challenges are related to certain windows of opportunity. In this way, when challenge data is issued, there is a limited time to respond to the challenge before a new challenge is issued. This is typically done to reduce the ability of node administrators to cheat and either overtake the blockchain or gain rewards without storing data. One of the ways the Chia networks marks elapsed time in relation to challenges is to provide and transmit signage points related to each individual chain within the network. Thus, when a potential solution to a challenge is generated, it must also incorporate some reference to the current signage point.

Process 300B may take various pieces of data to create a plot filter hash (block 315). A blockchain network may have a large number of nodes that each contain a large number of plots. In order to keep the network from being overrun with superfluous challenge solutions and to add an additional layer of security, a filter may be used to restrict the number of plots that may be used for solution generation. This plot filter can be formatted as a requirement associated with various aspects of the plot that must be met. For example, various data values related to the plot can be concatenated or added together, which can then be hashed to generate a unique value.

Typically, in Chia, the plot hash filter is generated by hashing the sum of the plot identification number, the current challenge data, and the current signage point data. However, as discussed in more detail below, many embodiments of the current disclosure utilize the plot identification number, challenge data, signage point data, and commitment data. This commitment data will be described in more detail below, but it can be generally understood to be a value that helps prove that a Chia node has actually stored the value for a particular length of time.

This unique plot filter value can then be examined to see if it meets the requirement (block 325). For example, in the Chia network currently, the resultant SHA256 plot filter hash number must start with nine zeroes (i.e., have nine leading zeros). If the plot filter hash value does not satisfy these conditions, then the process of evaluating this plot can finish and proceed on a new plot. However, if the filter requirements were met, then process 300B can evaluate the "quality" of the plot.

As described in more detail below within the discussion of FIG. 5, Chia plot data is typically configured to store a plurality of tables. These tables hold various data values. Additionally, the last table in the plurality of tables has a value inside. This value can be utilized to backpropagate and reference an entry within the previous table of the plot. This process can repeat until a value within the first table of the plot is reached. Currently, Chia tables have 32 entries in each table, but any number can be acceptable.

Instead of reading the entire plot, a quality check can be done by selecting a single initial value and reading just that branch that runs back to the initial table (block 335). Quality data may be a string that is used as a shorthand to evaluate the plot as a whole. In some embodiments, the initial entry for the quality data generation is based on the currently received challenge data. In this way, a bad-faith node administrator cannot simply evaluate the quality of the plots beforehand and gain a speed advantage. The result data read from the single branch can be hashed to generate a single quality string value. This quality string value can determine the overall proof of quality of the plot for this challenge (block 345).

If the quality of the plot is not above a certain predetermined threshold, the evaluation of that plot can end and move onto a new plot (block 355). However, if the quality of the plot is above the predetermined threshold, a proof-of-space challenge solution can be generated. This potential solution will require the entire plot to be read. Process 300B can then access and read the entire proof-of-space within the plot (block 365). In some embodiments, the predetermined threshold is a value that has been generated by the Chia blockchain network timelords. In a number of these embodiments, that value is the required iterations that must have been performed between the last block addition or signage point transmission.

Figure 4:
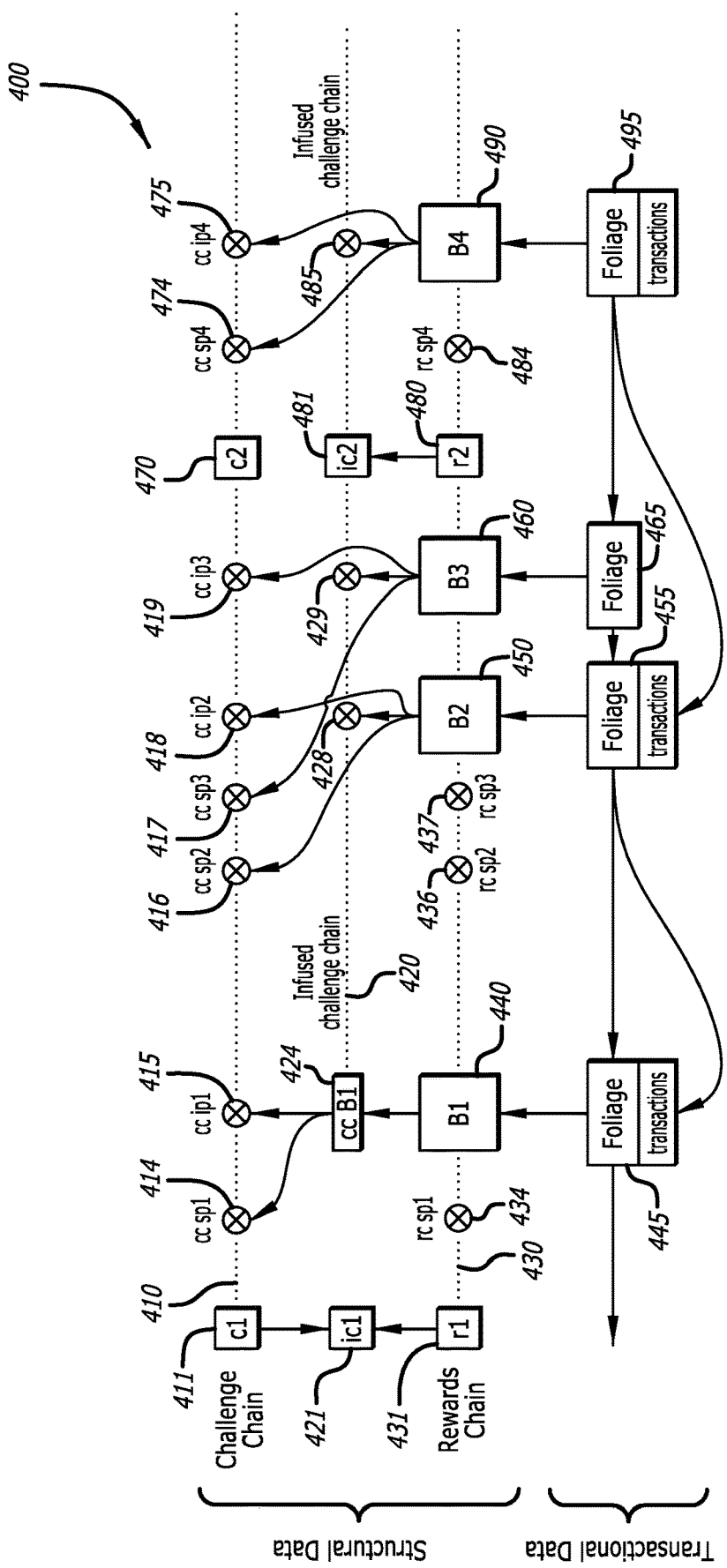
FIG. 4 is a conceptual diagram of new blocks being added to a Chia blockchain in accordance with an embodiment of the disclosure.

Referring to FIG. 4, a flowchart depicting a process 400 for mining cryptocurrency utilizing a proof-of-space consensus method is shown. Specifically, process 400 depicted in the embodiment of FIG. 4 is an exemplary proof-of-space and proof-of-time blockchain process using the Chia cryptocurrency. At a high level, Chia is mined based on the amount of storage space devoted to it rather than the processing power. It should be appreciated that any other cryptocurrency that relies on storage space may be used or otherwise substituted with respect to the systems and methodologies discussed herein, including by way of non-limiting example, FileCoin, Signum Network, and/or Spacemesh. Similar to the typical blockchain process described above with respect to FIG. 2, process 400 utilizes a successive series of structural data and paired transactional data over a series of blocks that are added over time.

The design of the structural data includes three different "chains" of data that reference and depend on each other in various ways that allow for the secure and decentralized nature of the proof-of-space method. These chains may be understood in certain contexts as each being a verifiable delay function that is executed concurrently with the others, wherein each chain serves a different purpose. The blocks themselves are associated with a rewards chain 430, while the issued challenges are associated with a challenge chain 410. A third infused challenge chain 420 is utilized for facilitating various challenges and security measures necessary for adding blocks to the blockchain. Each of these chains has certain markers that indicate the end of a period of time. These points along the chain are typically uniform in time together. The time elapsed between two adjacent points is typically referred to as a sub-slot.

The challenge chain has a first challenge chain point c1 411 and a second challenge chain point c2 470. Likewise, the rewards chain has a first rewards chain point r1 431 and a second rewards chain point r2 480. Finally, the infused challenge chain 420 has a first infused chain point ic1 421 and a second infused challenge chain point ic2 481. The arrows in FIG. 4 indicate that the generation of the receiving point is dependent on the sending point. So, for example, in FIG. 4, the infused challenge point 1 is dependent on and/or generated from one or more values within the challenge point c1 411 and the rewards chain point r1 431. The distance between these two points on the x-axis equates to a period of time. The distance between these two sets of points is the sub-slot for this process 400. In many embodiments, the sub-slot corresponds to a fixed number of iterations of one or more verifiable delay functions. This may vary depending on adjusted difficulty but often is variable to provide a somewhat fixed period of time between sub-slots. For example, the Chia blockchain is currently configured to have ten-minute sub-slots processing windows.

Each sub-slot within the challenge chain 410 and reward chain 430 is divided into a number of smaller verifiable delay functions. In a number of embodiments, the number of smaller verifiable delay functions is sixty-four. In between each of these smaller verifiable delay functions, one or more signage points exist, such as rewards chain signage point 1 434. Within the Chia blockchain network, the timelords publish the output and proof of the smaller verifiable delay functions when a signage point is reached. At each signage point (and including at each challenge point), a challenge in the form of challenge data is broadcast across the blockchain network for processing.

Farmers within the blockchain network can begin by processing that challenge as described above with reference to FIG. 3. For example, a challenge may be issued at challenge chain c1 411 across the Chia network. At least one farmer within the network begins to process a valid solution to this challenge. At some later point, a viable solution is found, and that solution is transmitted back to the network along with a potential new block B1 440 to add to the blockchain. To verify that this block is acceptable, the proposed solution must include a proof that associates the block with both the challenge chain signage point sp1 414 and the challenge chain infusion point 415. Infusion points can be understood as points along the various chains where it is expected that a provided challenge should have an answer. In practice, the time between signage points and their corresponding infusion points are windows of opportunity to answer the challenge. The exact time allowed on these windows can vary based on a number of conditions. For example, in the Chia blockchain system, various factors can be adjusted such that only about thirty-two viable proof-of-space solutions are submitted to the blockchain network for approval.

The first block approved within a sub-slot can also serve as the first infused challenge chain block B1 424. In order to avoid certain attacks and increase overall blockchain security, the remaining blocks to be added within this sub-slot will have to provide a proof that references this first infused challenge chain block in some fashion.

As more time processes, another challenge chain signage point sp2 416 is released to the blockchain network. Likewise, a corresponding rewards chain signage point sp2 436 is also broadcast out. Farmers begin processing that challenge. However, it is not necessary that one issued challenge be completed before another challenge is issued. For example, in FIG. 4, challenge chain infusion point sp3 417 is broadcast out to the blockchain network before the next block is added that depends on the challenge chain signage point sp2 416. Similarly, another corresponding rewards chain signage point sp3 437 is also released. This is acceptable in various proof-of-space consensus methods, including Chia.

In the embodiment depicted in FIG. 4, a farmer has provided block B2 450 to the network, which is added to the rewards chain 430. Block B2 450 provides one or more proof-of-space solutions that incorporate or otherwise reference the original challenge chain signage point sp2 416 and the current challenge chain infusion point ip2 418, as well as the current, infused challenge chain iteration 428. A short time later, another farmer provided block B3 460, which is also added to the rewards chain 430 and itself incorporates one or more proofs implicating or otherwise referencing challenge chain signage point sp3 417, challenge chain infusion point ip3 419, and the infused challenge chain iteration 429.

As those skilled in the art will recognize, blocks may be added in any number and speed depending on the operation of the blockchain network. For example, in current Chia blockchains, approximately thirty-two blocks may be added between sub-slots. However, fewer blocks are shown in the embodiment of FIG. 4 for space and clarity reasons. However, it is contemplated that more blocks and activity may be happening during these periods of time.

Upon completion of the sub-slot, the Chia timelords can issue another challenge point c2 470 and corresponding rewards chain point r2 480. In typical sub-slots, the infused challenge chain would be temporarily ended by generating an infused challenge point that is dependent upon both the corresponding challenge and rewards chain points. However, in certain sub-slots, there may be scenarios where the number of blocks added is insufficient. In these cases, such as the embodiment depicted in FIG. 4, the infused challenge chain point ic2 481 may only be dependent upon the rewards chain point r2 480. In this way, the infused challenge chain 420 can continue for use in the following block to be added, block B4 490.

Comparable to the previously added blocks B2 450 and B3 460, new block B4 490 provides one or more proof-of-space solutions that incorporate or otherwise reference the challenge chain signage point sp4 474 (which was issued alongside corresponding rewards chain signage point sp4 484), and the current challenge chain infusion point ip4 475 as well as the current infused challenge chain iteration 485. Each of the added blocks in the process 400 included various transactional data along with their structural data.

In Chia terms, the added transactional data is referred to as "foliage." In many embodiments, foliage data can include details regarding what the reward was for the block, who earned the reward, and where the reward should be issued. As described in more detail below, various data regarding the plots of Chia farmers may be incorporated and added in this section. Data regarding transactions may also be added, which acts as a cryptocurrency. Each block is required to have some foliage data, but not every block is required to have transaction data.

With respect to process 400 depicted in FIG. 4, the first block B1 440 is associated with a first transactional data 445, which includes one or more transactions. Likewise, block B2 450 includes a second transactional data 455, which also includes one or more transactions. The foliage of the second transactional data 455 refers back to the foliage of the first transactional data 445 and the transactions. The block B3 460 included foliage in the respective third transactional data 465 but did not comprise any transactions. The foliage of the third transactional data 465 again references back to the second transaction data 455. Finally, block B4 490 includes a fourth transactional data 495, which comprises foliage and one or more transactions. The foliage of the fourth transaction data 495 references back to the foliage of the third transactional data 465 but also references back to the previous transactions which were within the second transactional data 455. Each proof-of-space solution generated for this process 400 must be obtained from previously stored data on one or more storage devices on a node within the blockchain network. The structure of that data in many embodiments is discussed below in more detail.

Figure 5:
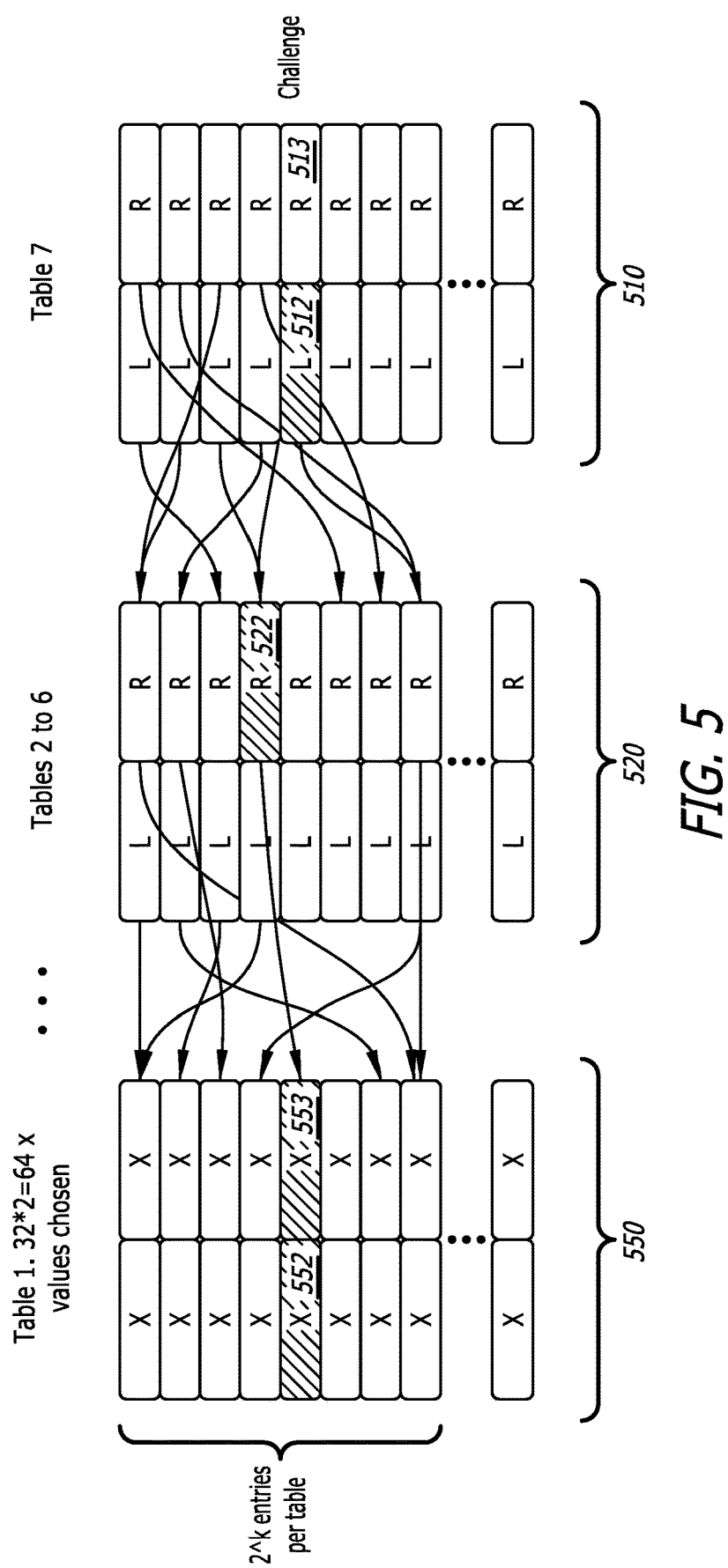
FIG. 5 is a conceptual depiction of a plurality of hash tables for use in a Chia blockchain in accordance with an embodiment of the disclosure.

Referring to FIG. 5, a conceptual depiction of a plurality of hash tables for use in a Chia blockchain in accordance with an embodiment of the disclosure is shown. As described above with respect to the discussion of FIG. 3B, the plot data may include a plurality of tables 510, 520, 550. These tables 510, 520, 550 may be organized in a sequential manner with a first table 550, last table 510, and ordered tables 520 in between. In many embodiments, Chia plot data will have seven tables, but it is contemplated that other sizes are available. The last ($7^{th}$) table 510 will be comprised of a series of values. The challenge data may indicate that a first value 512 and second value 513 are being requested for evaluation.

To check the quality of the plot, a single value and the resultant backpropagated values can be read, combined, and hashed. The first value 512 is selected as the quality candidate. In a number of embodiments, the selection of which value to evaluate for quality is based on the current challenge data. The first value 512 references a next entry 522 in table 6. The value of the entry in table 6 references an entry within table 5 and so forth until a final pair of entries is referenced. These final two entries 552, 553 are just two entries out of the 4,294,967,296 ($2^k$ where k=32) entries that will be part of the quality evaluation. If the plot has a sufficient quality evaluation, all 4,294,967,296 entries and their associated backpropagated values will be read for the proof-of-space potential solution.

Figure 6:
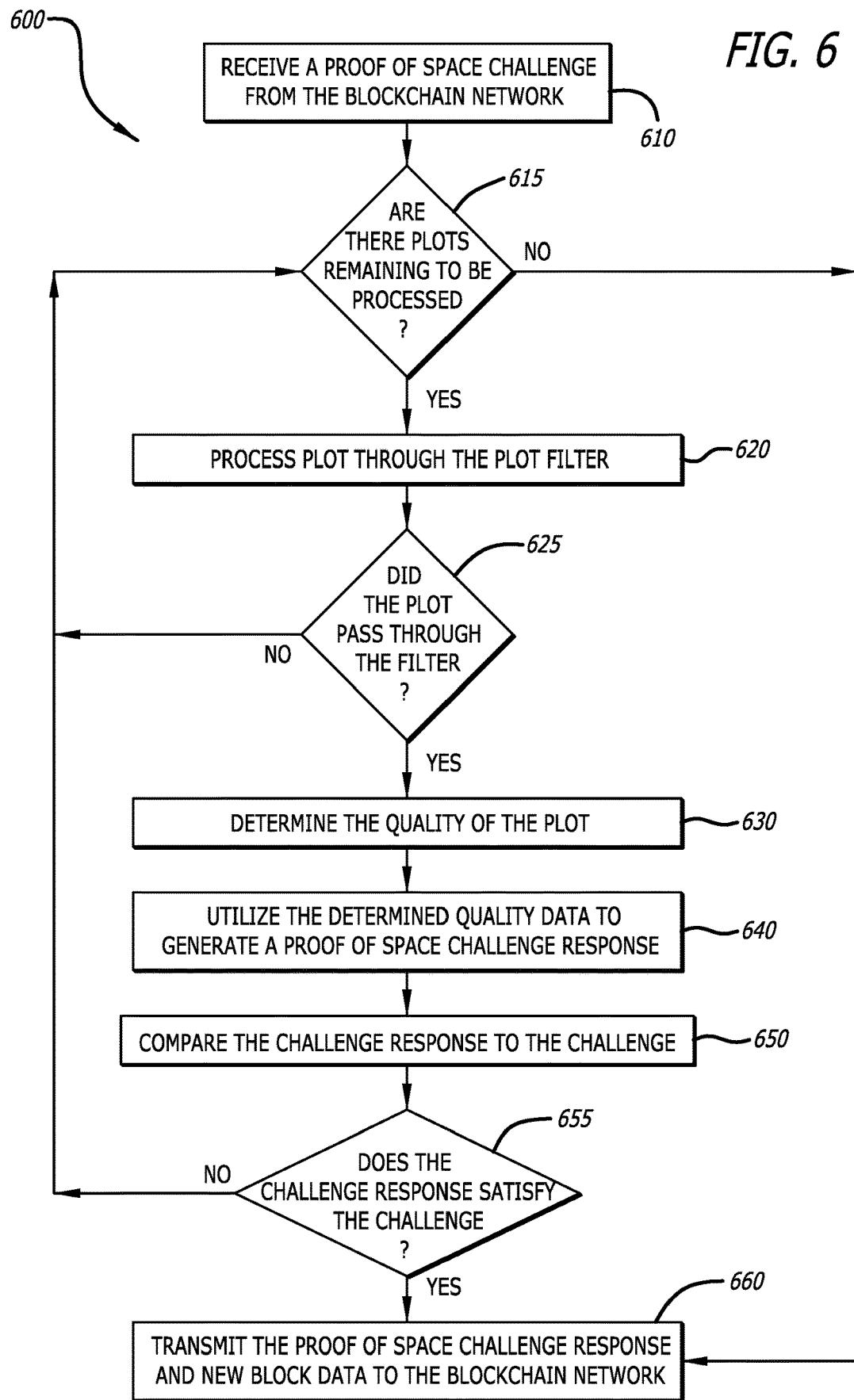
FIG. 6 is a flowchart depicting a process for responding to challenges within a Chia blockchain network in accordance with an embodiment of the disclosure.

Referring to FIG. 6, a flowchart depicting a process 600 for responding to challenges within a Chia blockchain network in accordance with an embodiment of the disclosure is shown. Understanding all we have discussed previously, a more detailed process 600 for handling challenges within the Chia blockchain system is outlined below. Upon setting up a plurality of plots within one or more storage devices, the Chia blockchain node can first receive a proof-of-space challenge from the blockchain network (block 610). In many embodiments, the challenge will be in the form of challenge data that is generated by Chia timelords. Once received, the Chia node may determine if there are any plots to be processed (block 615).

When a plot is available for evaluation, a number of embodiments first pass the plot through a plot filter (block 620). As discussed previously, various embodiments utilize different points of data, including a commitment value, to generate a single hashed value that is evaluated to determine if it meets the requirements of the plot filter and passed (block 625). If the current plot did not pass through the filter, then process 600 can determine if another plot is remaining to be processed (block 615).

However, if the current plot under evaluation did pass through the plot filter, process 600 can determine the quality of the plot (block 630). As discussed above, the quality of the plot is often judged based on the values from a single selected branch of the tables stored within the plot. If the quality of the plot is sufficient, then the quality data can be utilized to generate a proof-of-space challenge response for submission (block 640). This can typically be done by doing a full read of the plot data referenced by the challenge. The resulting proof-of-space challenge response is then compared to the actual challenge (block 650).

Process 600 can process this to determine if the challenge response proof-of-space satisfies the challenge (block 655). In many embodiments, the challenge provides a fixed number of required iterations that have been done to a specific data set. If the generated proof-of-space challenge response has a required iterations value that is less than that of the challenge, then the proof-of-space solution is viable. A viable proof-of-space challenge response can be paired with new block data and transmitted to the blockchain network (block 660). If the challenge response does not satisfy the challenge, then process 600 can evaluate the next plot (block 615). Each plot is analyzed in this manner until all plots within the node have been evaluated.

Figure 7A:
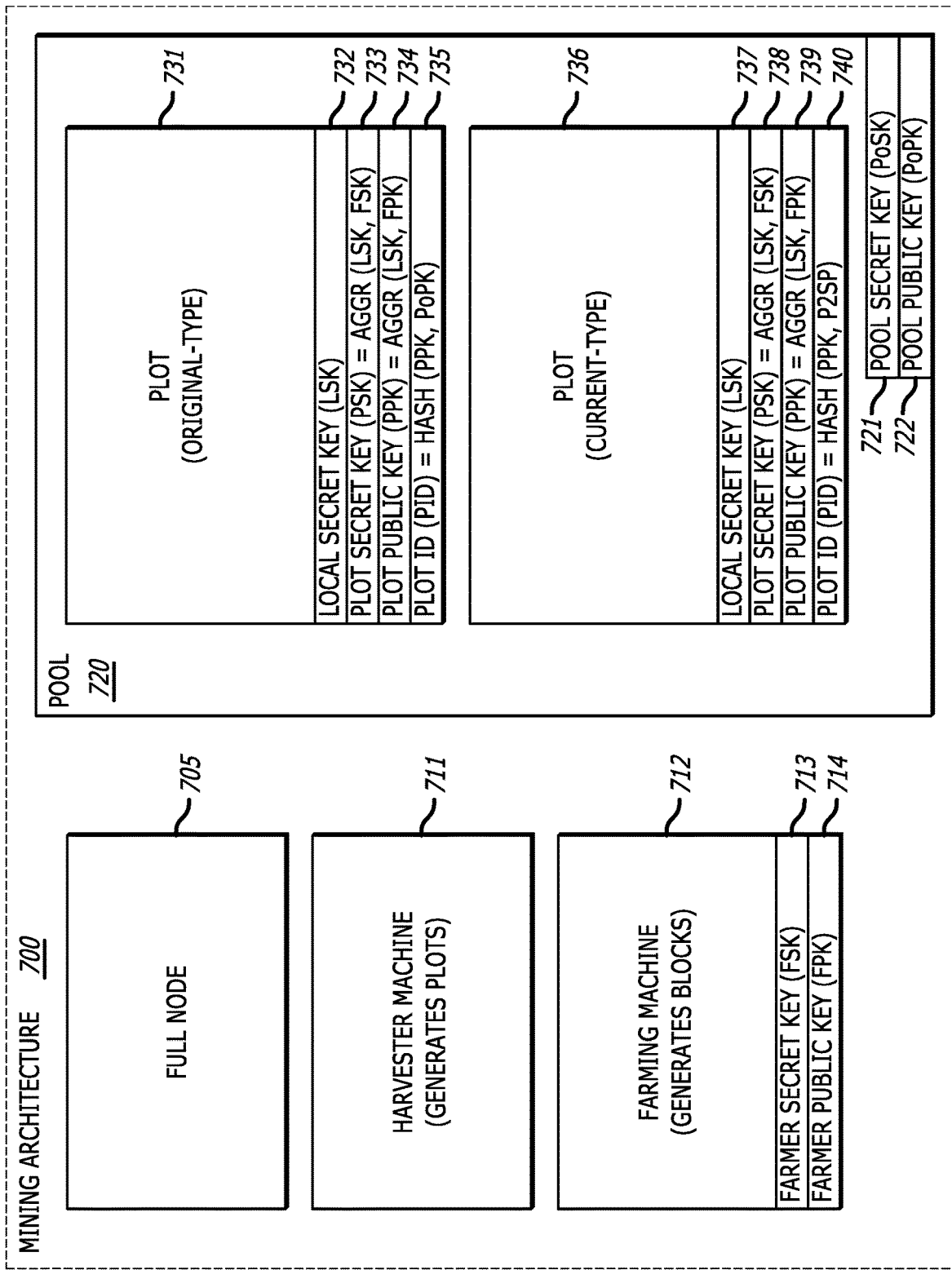
FIG. 7A is a conceptual diagram of a blockchain mining architecture in accordance with an embodiment of the disclosure.

Referring to FIG. 7A, a conceptual diagram of a blockchain mining architecture in accordance with an embodiment of the disclosure is shown. Mining architecture 700 may comprise a full node 705, which may comprise one or more processors running a blockchain full node application. Mining architecture 700 may further comprise a harvester machine 711 for generating plots, a farming machine 712 for generating blocks in responses to challenges, and a pool 720 for storing the plots generated by harvester machine 711 or obtained otherwise from a seller or another miner. A Chia mining architecture is shown as an example, but it is understood that other blockchain networks may be used.

Farming machine 712 may have Farmer Secret Key (FSK) 713 and Farmer Public Key (FPK) 714 associated with it. These keys may be used for various cryptographic purposes related to the operation of the blockchain. Pool 720 may have a Pool Secret Key (PoSK) 721 and a Pool Public Key (PoPK) 721 associated with it. These keys may also be used for various cryptographic purposes related to the operation of the blockchain. Pool 720 also may have plots 731 and 736 associated with it.

Plot 731 may be of the original-type of Chia plot. In addition to the 100+ Gigabytes (GB) of plot data used for answering challenges, Plot 731 may also have several keys associated with it. There may be Local Secret Key (LSK) 732, Plot Secret Key (PSK) 733, which may be an aggregation of LSK 732 and FSK 713, and Plot Public Key (PPK) 734, which may be an aggregation of LSK 732 and FPK 714. Also associated with plot 731 may be Plot Identification (PID) 735, which may be a hash of PPK 734 and PoPK 722. Generating PID 735 this way may have the disadvantage of locking the plot into pool 720 forever.

Plot 736 may be of the current-type of Chia plot. In addition to the 100+ Gigabytes (GB) of plot data used for answering challenges, Plot 736 may also have several keys associated with it. There may be Local Secret Key (LSK) 737 and Plot Secret Key (PSK) 738, which may be an aggregation of LSK 737 and FSK 713, Plot Public Key (PPK) 739, which may be an aggregation of LSK 737 and FPK 714. Also associated with plot 731 may be Plot Identification (PID) 740, which may be a hash of PPK 739 and P2SP (discussed below). Generating PID 740 this way may have the advantage of plot 736 being transferable from pool 720 to another pool by the farmer. This transferability was the motivation for the Chia blockchain moving to the current-type of plots.

There are also a number of related Non-Fungible Tokens (NFTs) that are a part of the blockchain but not part of block 736. Like other NFTs, they are controlled by a secret key in the possession of the block owner. One, in particular, p2_singleton_puzzle_hash (P2SP), may be used to generate PID 740 as described above. This enables the plot to be transferred to a new owner with the transfer of the controlling secret key. P2SP is sometimes called the pool contact address.

Figure 7B:
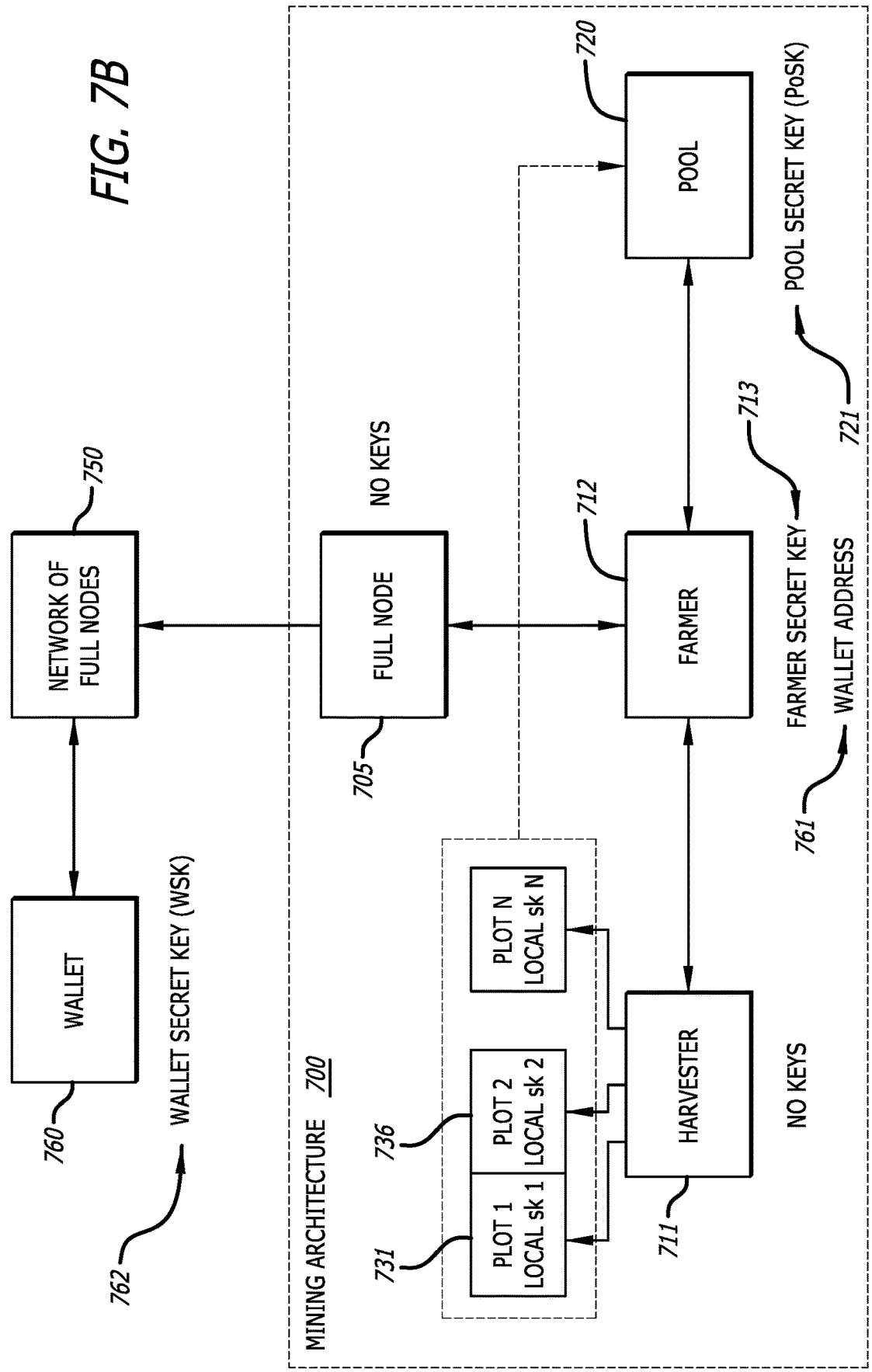
FIG. 7B is a conceptual diagram of a blockchain mining network in accordance with an embodiment of the disclosure.

Referring to FIG. 7B, a conceptual diagram of a blockchain mining network in accordance with an embodiment of the disclosure is shown. Present in the figure may be mining architecture 700, full node 705, harvester machine 711, farming machine 712, pool 720, and plots 731 and 736 discussed in conjunction with FIG. 7A above. Full node 705 may be the access point to the rest of the blockchain network of full nodes 750. These nodes may all be in communication with one another and may collectively manage the blockchain network by consensus. Also present in the figure is wallet 760, which, in some embodiments, may be located out in network 750 at address 761 and controlled by the Wallet Secret Key (WSK) 762. In other embodiments, the wallet 760 may be present internal to mining architecture 700. Some of the important secret keys are also shown, such as FSK 713, PoSK 721, and WSK 762.

Figure 8:
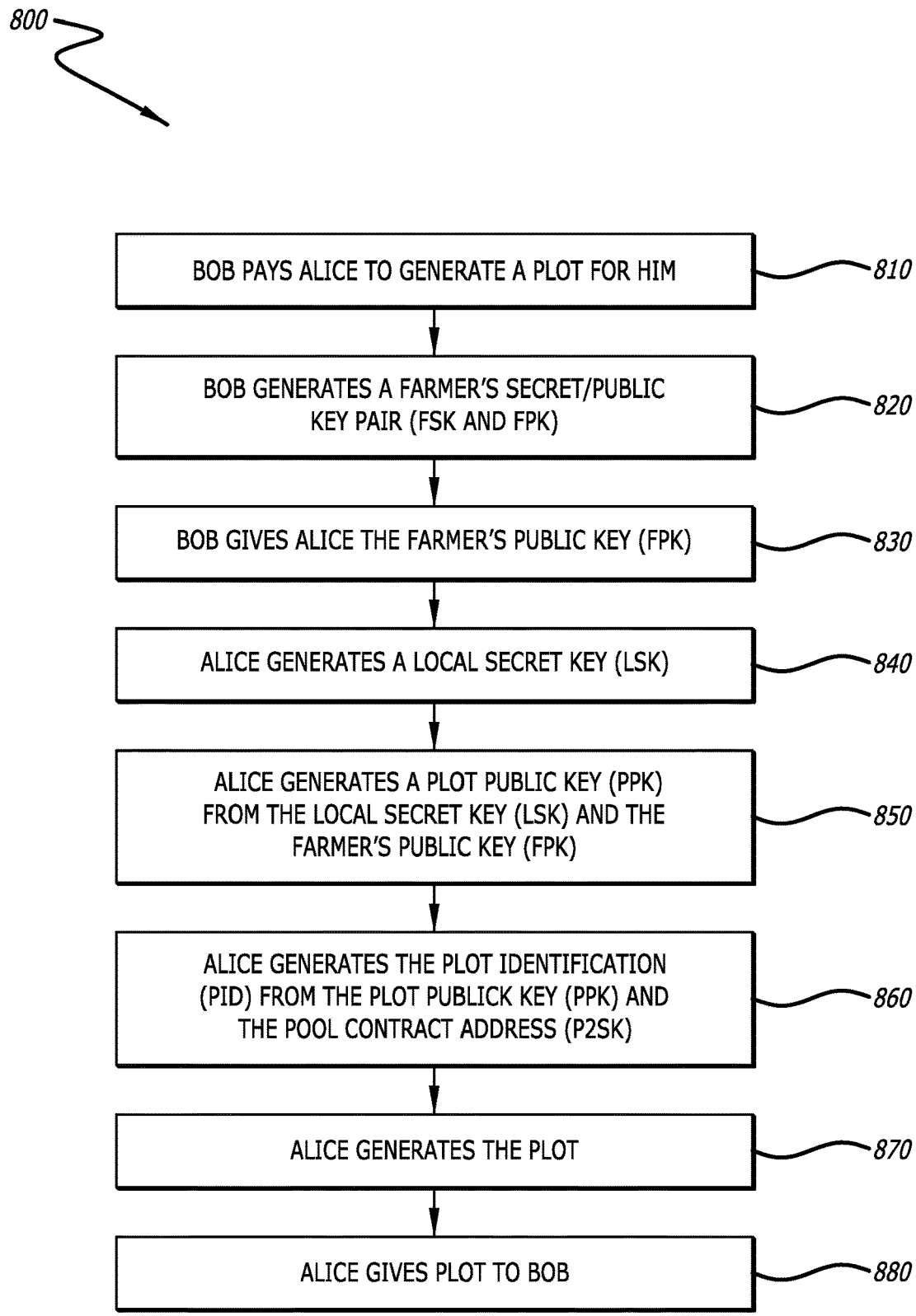
FIG. 8 is a flowchart depicting a process for generating a blockchain plot by one person for transfer to another person in accordance with an embodiment of the disclosure.

Referring to FIG. 8, a flowchart depicting a process 800 for generating a blockchain plot by one person for transfer to another person in accordance with an embodiment of the disclosure is shown. For illustrative purposes, this flow chart will assume that plot 736 of FIG. 7A is being generated, and the reference numbers from that figure will be used to help clarify the process. Process 800 may begin with a buyer of plots, Bob, asking a seller of plots, Alice, to generate a plot for him in exchange for an agreed-upon price, and Bob pays Alice up front (block 810). Bob may generate a Farmer's Secret Key (FSK) 713 and a Farmer's Public Key (FPK) 714 pair (block 820). Bob may do this at the time for this purpose, or he may use the keys he is currently using as the farmer of his own mining operations. Bob may then give the FPK 714 to Alice (block 830).

Alice may generate a Local Secret Key (LSK) 737 (block 840). Alice may use the LSK 737 and the FPK 714 to generate a Plot Public Key (PPK) 738 (block 850). Alice may generate the Plot Identification (PID) 740 from the PPK 738 and the pool contract address (P2SK) (block 860). Alice may generate plot 736 (block 870). Finally, Alice may give plot 736 to Bob along with the owner's secret information, including the LSK 737. Bob may then assign plot 736 to whatever pool he wishes to use for his mining operations. Process 800 may be a typical way that a proof-of-space consensus blockchain plot may be created for transfer. While a Chia block 736 has been assumed, it is understood that this process may apply to other proof-of-space consensus blockchains.

Figure 9:
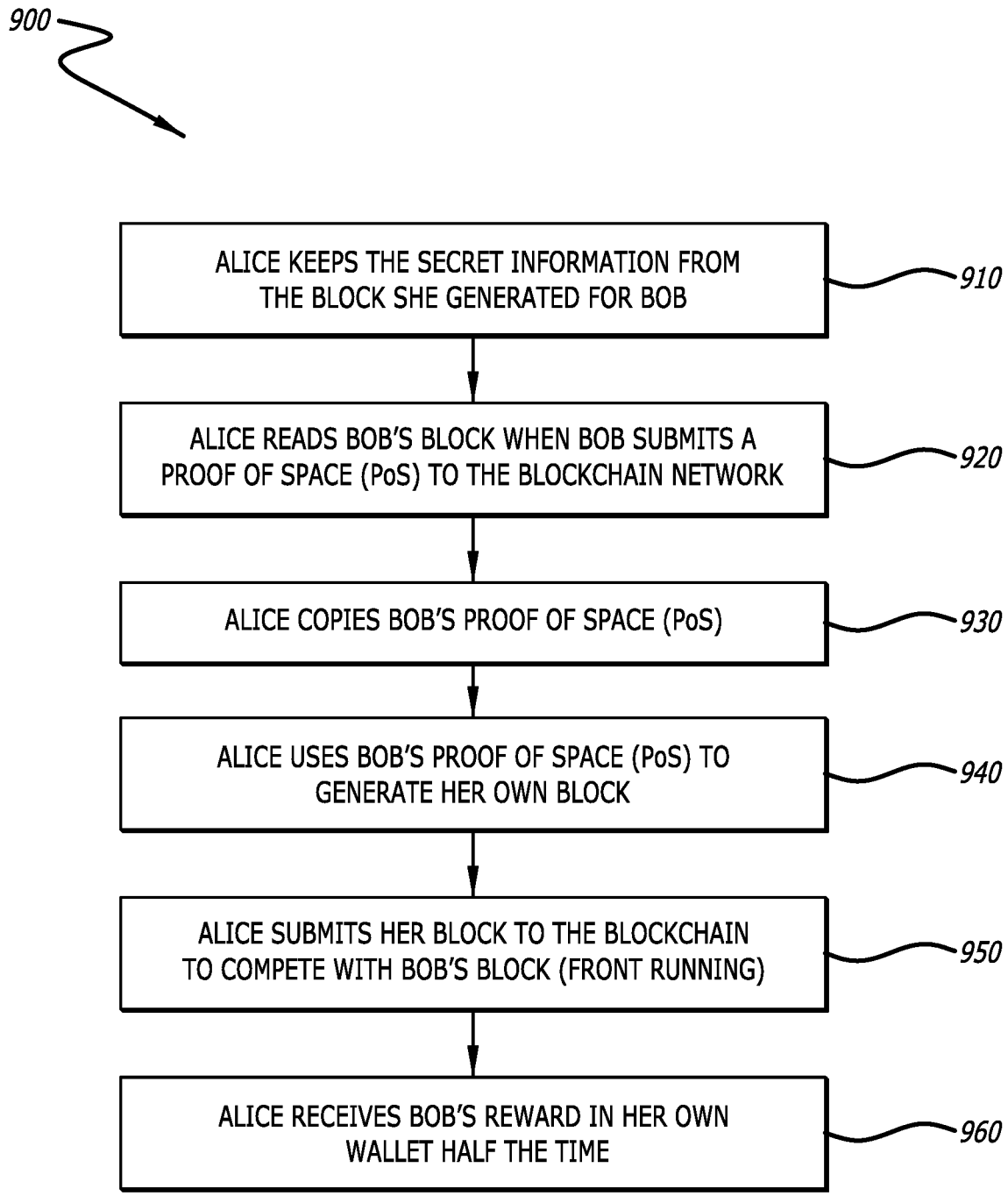
FIG. 9 is a flowchart depicting a process of a front-running attack on a proof-of-space consensus blockchain in accordance with an embodiment of the disclosure.

Referring to FIG. 9, a flowchart depicting a process 900 of a front-running attack on a proof-of-space consensus blockchain in accordance with an embodiment of the disclosure is shown. Process 900 assumes that Alice is a bad-faith actor and has generated a plot for Bob. After the transfer, Alice may have kept a copy of the secret information for the block she generated for Bob (block 910). Alice may monitor the blockchain network watching for Bob to submit a challenge response block with a Proof-of-Space (PoS) based upon the block she generated (block 920).

Alice may copy Bob's PoS (block 930) and use the secret information she retained to generate her own challenge response block (block 940). Alice's block may have a number of changes, the most important being the wallet address will point to Alice's wallet instead of Bob's. Alice may submit her block to the blockchain network as another challenge response block, essentially competing with Bob's original block for the reward if her block is chosen (block 950). Given the random nature of block selection by the blockchain, Bob will only see half of the return he is expecting, and Alice will get the other half (block 960). Bob will realize his return is low, but it is very difficult for him to catch Alice—or even prove that the PoS in her block was originally his if he does. Defense against this sort of front-running attack may be the motivation for replacing the PoS portion of a challenge response block with a Proof-of-Knowledge (PoK) portion, as discussed below.

Figure 10A:
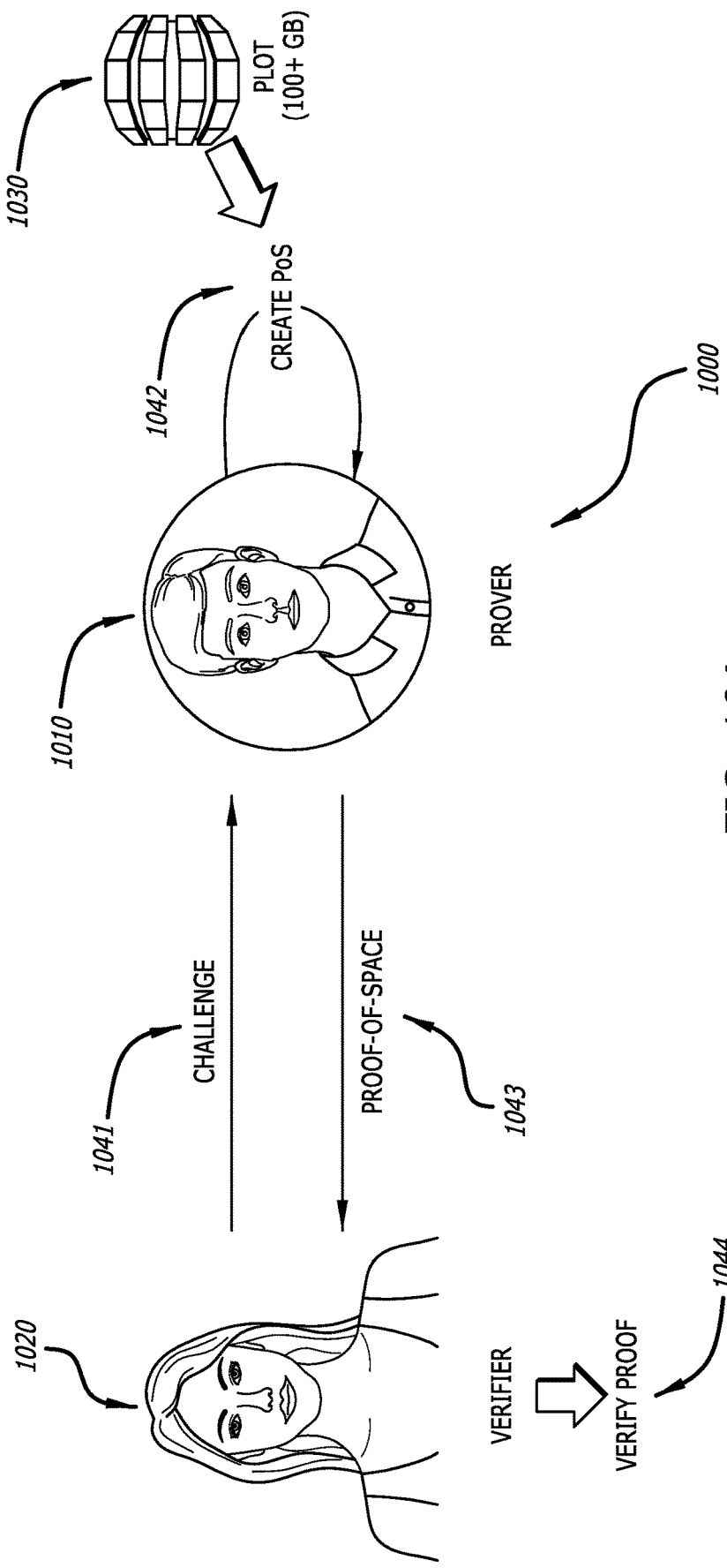
FIG. 10A is a conceptional diagram of a process 1000 for the verification of proofs-of-space suitable for use in proof-of-space consensus blockchain processing in accordance with an embodiment of the disclosure.

Referring to FIG. 10A, a conceptual diagram of a process 1000 for the verification of proofs-of-space suitable for use in proof-of-space consensus blockchain processing in accordance with an embodiment of the disclosure is shown. Process 1000 may involve a prover 1010 (who may be a farmer with a mining operation) and a verifier 1020 (who may be a timelord). They may be referred to as prover 1010 and verifier 1020 because the prover 1010 may be trying to prove to the verifier 1020 that he has a valid proof of space for his plot 1030, while the verifier may be attempting to verify the prover's 1010 proof-of-space is valid.

A verifier 1020 may send out a challenge to the blockchain network (arrow 1041). Every prover 1010 on the network may have an opportunity to submit a challenge response block with a valid PoS from one of their plots. Prover 1010 may generate a PoS based upon plot 1030 (arrow 1042) and may send it to the verifier 1020 (arrow 1043). This is the place where a front-running attack may take place. A bad faith actor may see the challenge response block, appropriate the PoS, and then submit a competing block to the verifier 1020. The verifier may receive the PoS from the prover (arrow 1043) and may verify the proof (arrow 1044). If a bad-faith actor also submits a block with the same PoS to the verifier 1020, the proof will be validated if the PoS is valid and have the same quality as the PoS from the original prover 1010.

Figure 10B:
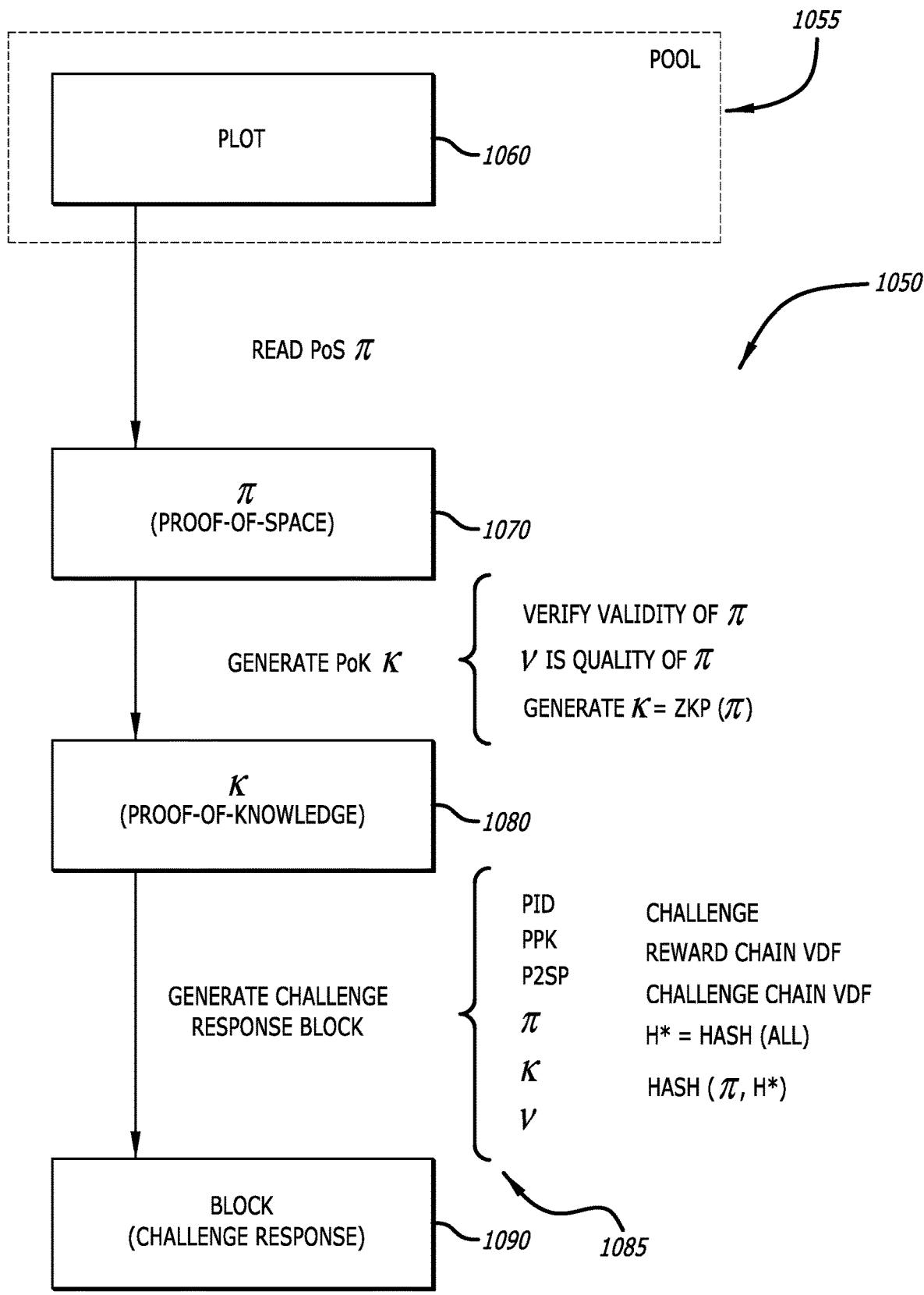
FIG. 10B is a conceptional diagram of a process for generating challenge response blocks suitable for use in proof-of-knowledge consensus blockchain processing in accordance with an embodiment of the disclosure.

Referring to FIG. 10B, a conceptual diagram of a process 1050 for generating challenge response blocks suitable for use in proof-of-knowledge consensus blockchain processing in accordance with an embodiment of the disclosure is shown. A prover's mining operation may have a pool 1055 comprising a plot 1060. When a challenge is received from a verifier, plot 1060 may be evaluated to determine if it is an appropriate basis for a Proof-of-Space (PoS) to answer the challenge successfully in a manner similar to that discussed in conjunction with FIG. 3B above. If so, then PoS $\pi$ 1070 may be read from plot 1060.

Several steps 1075 may be required to generate Proof-of-Knowledge (PoK)$\kappa$ 1080. First, the validity of $\pi$ 1070 may be determined in a manner similar to that discussed in conjunction with FIG. 6 above. The quality $v$ of $\pi$ 1070 may then be determined. In a standard PoS blockchain, the verifier may determine the quality of proof $v$. With a PoK blockchain, the verifier cannot see the PoS, so the prover may generate and send proof in some form acceptable to the verifier. To generate PoK $\kappa$ 1080, a Zero-Knowledge Proof (ZKP) is used.

ZPK is a known cryptographic technique used to validate statements. In theory, any statement that can be encoded into a PoK may be validated. The PoK may prove to be valid if and only if the statement is true. In one exemplary embodiment, the statement underlying the PoK $\kappa$ may be "I have a PoS $\pi$ with a quality value of $v$" (e.g., the PoK block will contain the output of $\kappa$=ZKP(it) along with $v$ and a variety of other things). If that PoK $\kappa$ is sent to a verifier and proves to be valid, the verifier can trust the prover has successfully proven the validity of his PoS and its quality. The difference is that neither the verifier nor any bad-faith actor on the blockchain network actually knows anything about PoS Tr. Since the PoS π itself may not be needed to generate the next block in the blockchain if the prover's block wins the competition, there is no need for the verifier to ever see it. Examples of ZPK protocols used in blockchains include zk-SNARK, Groth16, Zerocash, Mimblewimble, Sigma, Lelantus, etc.

Once κ is generated, a challenge response block 1090 may be generated. Many things may go into block 1090. Some, but not all, that are discussed in this disclosure may be listed by bracket 1085 and include the PID, the PPK, the P2SP, π, κ, v, the challenge, the reward chain Verifiable Delay Function (or VDF which is sometimes referred to as a Proof-of-Time or PoT), the challenge chain VDF, and a hash of the entire challenge response block (H*) that is itself hashed with PoS π (HASH(π, H*)). The challenge response block 1090 may then be sent to the verifier for validation.

Figure 11:
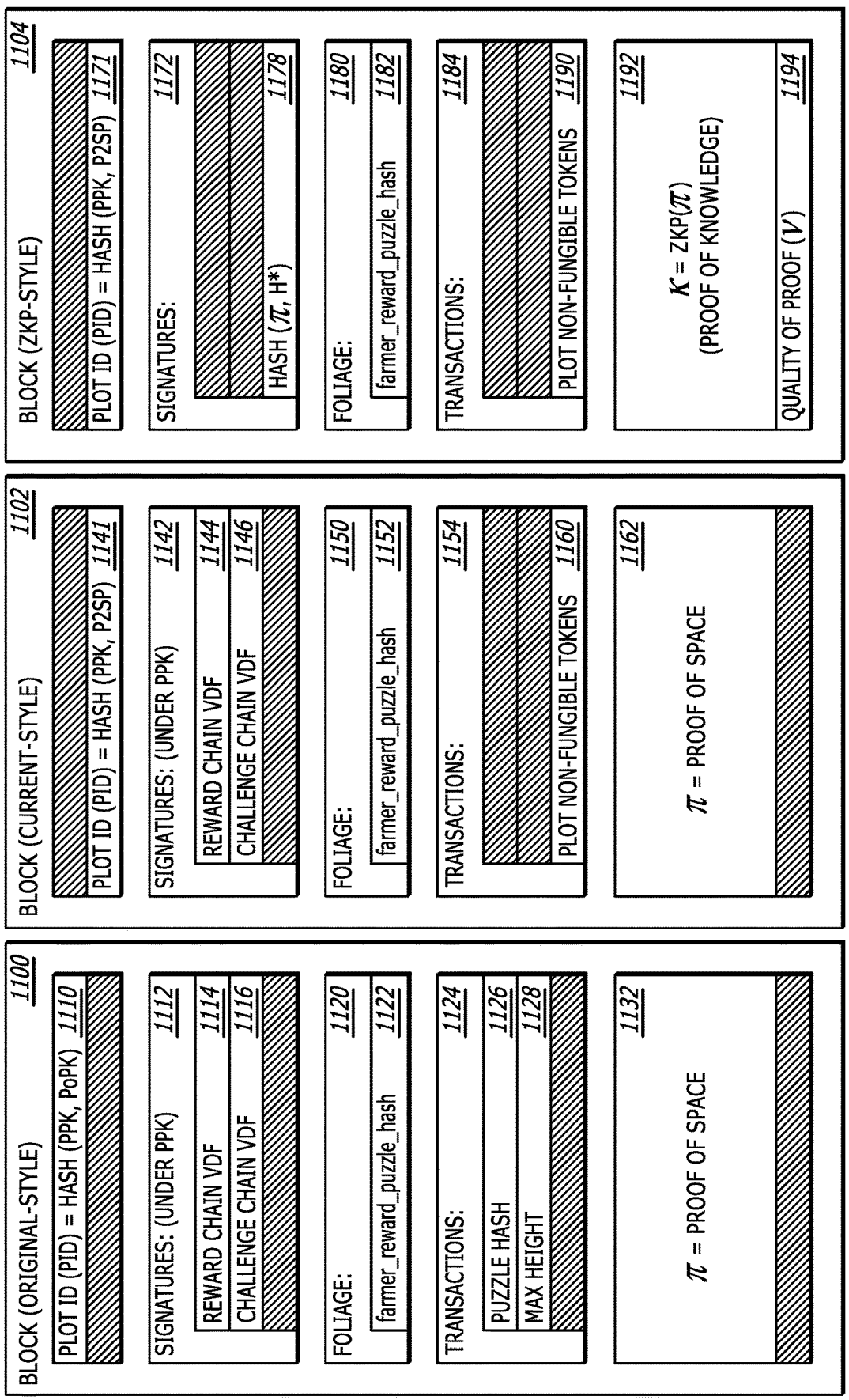
FIG. 11 is a block diagram illustrating the structure of three exemplary Chia challenge response block styles in accordance with an embodiment of the disclosure.

Referring to FIG. 11, a block diagram illustrating the structure of three exemplary Chia challenge response block styles in accordance with an embodiment of the disclosure is shown. The figure comprises an original-style block 1100, a current-style block 1102, and a Zero-Knowledge-Proof-style block 1104. It is understood that while Chia is being used as an example, the inventive principles apply to other blockchains as well. The darkened rectangles in the figure are placeholders for elements that are not present in all three block styles and to keep analogous elements on the same row in each block representation to facilitate understanding the differences between them. It is understood that not all elements of any of the block styles are present to avoid overcomplicating the disclosure of and obscuring the inventive aspects of the invention.

Original-style block 1100 may comprise Plot ID (PID) 1110, which may be generated by hashing Plot Public Key (PPK) with the plot's Pool Public Key (PoPK). This has the undesirable effect of permanently restricting the underlying plot to its original pool. Current-style block 1102 and ZKP-style block 1104 may have PIDs 1141 and 1171, respectively. In both cases, the PID may be generated by a hash of the PPK and the NFT generated p2_singleton_puzzle_hash (P2SP). Since the NFT may be controlled by a secret key, the holder of the secret key can move the underlying plot to a different pool. This portability issue was discussed in conjunction with FIG. 7A above.

For security purposes, original-style block 1100 and current-style block 1102 may require signatures under the PPK (1112 and 1142, respectively) for many different items. Two examples shown are the reward chain VDF (1114 and 1144, respectively) and the challenge chain VDF (1116 and 1146, respectively). ZKP-style block 1104 may not require signatures 1172 explicitly but may use hash functions instead. For example, PoS π can be hashed with a hash of the entire block except for PoK κ(H*) to produce HASH(π, H*) 1178.

The motivation to go to using ZKP-style proofs-of knowledge was to avoid a bad-faith actor stealing the proof-of-space (PoS n) as discussed in conjunction with FIG. 9 above. If a bad-faith actor can steal the proof-of-knowledge (PoK κ) and create a competing challenge response block and change the rewards address (farmer_reward_puzzle_hash) to their own wallet address, then nothing has been accomplished security-wise. In some embodiments, the prover can change the statement being proven from "I have a PoS π with a quality value of v" to "I have a PoS π with a quality value of v, and the hash of PoS π concatenated with my wallet address is H†." The prover can then add H† to the challenge response block. If a bad-faith actor tries to steal PoK κ, they cannot duplicate the hash H† to change the wallet address because they do not know PoS π. This will cause the entire block to fail to verify when examined by the verifier.

Even with this improvement, a bad-faith actor can cause trouble by submitting a competing block with other information altered. Thus, in various embodiments, the statement being proved may be changed to "I have a PoS π with a quality value of v, and the hash of PoS it concatenated with all of the block data (except PoK κ) is H*." The prover can then add H* to the challenge response block, and the entire contents cannot be tampered with by a competing block because all of the data in the block is now effectively "signed" with PoS ii, which only the prover knows.

As discussed in conjunction with FIG. 2 and FIG. 4 above, all blockchain blocks may come with structural data and transactional data. Transactional data may be further divided into foliage, which may be mandatory, and transactions that may be optional. In a number of embodiments, blocks 1100, 1102, and 1104 may come with foliage 1120, 1150, and 1180, respectively, and transactions 1124, 1154, and 1184 respectively. While many things may go into the foliage, only an important one, farmer_reward_puzzle_hash 1122, 1152, and 1154 respectively, (which is where the prover's wallet is located) is shown here since it was discussed above.

In certain embodiments, original-style block 1100 may have puzzle hash 1126 and max height 1128 in its transactions section 1124. Puzzle hash 1126 and max height 1128 are inputs to generating the original-style PID 1110, which locks the underlying plot to a particular pool. In certain other embodiments, blocks 1102 and 1104 will have plot non-fungible tokens (NFTs) 1160 and 1190 respectively in their transaction sections 1154 and 1184, respectively. Amongst other things, the NFT discussed above, P2SP, may be used to generate portable PIDs 1141 and 1171, respectively, so the underlying plot can be moved to different pools by the keeper of the NFT secret key. Challenge response blocks 1100 and 1102 may also include PoS π 1132 and 1162, respectively, while challenge response block 1104 may also include PoK κ 1192 and quality value v 1194, as discussed previously.

Figure 12:
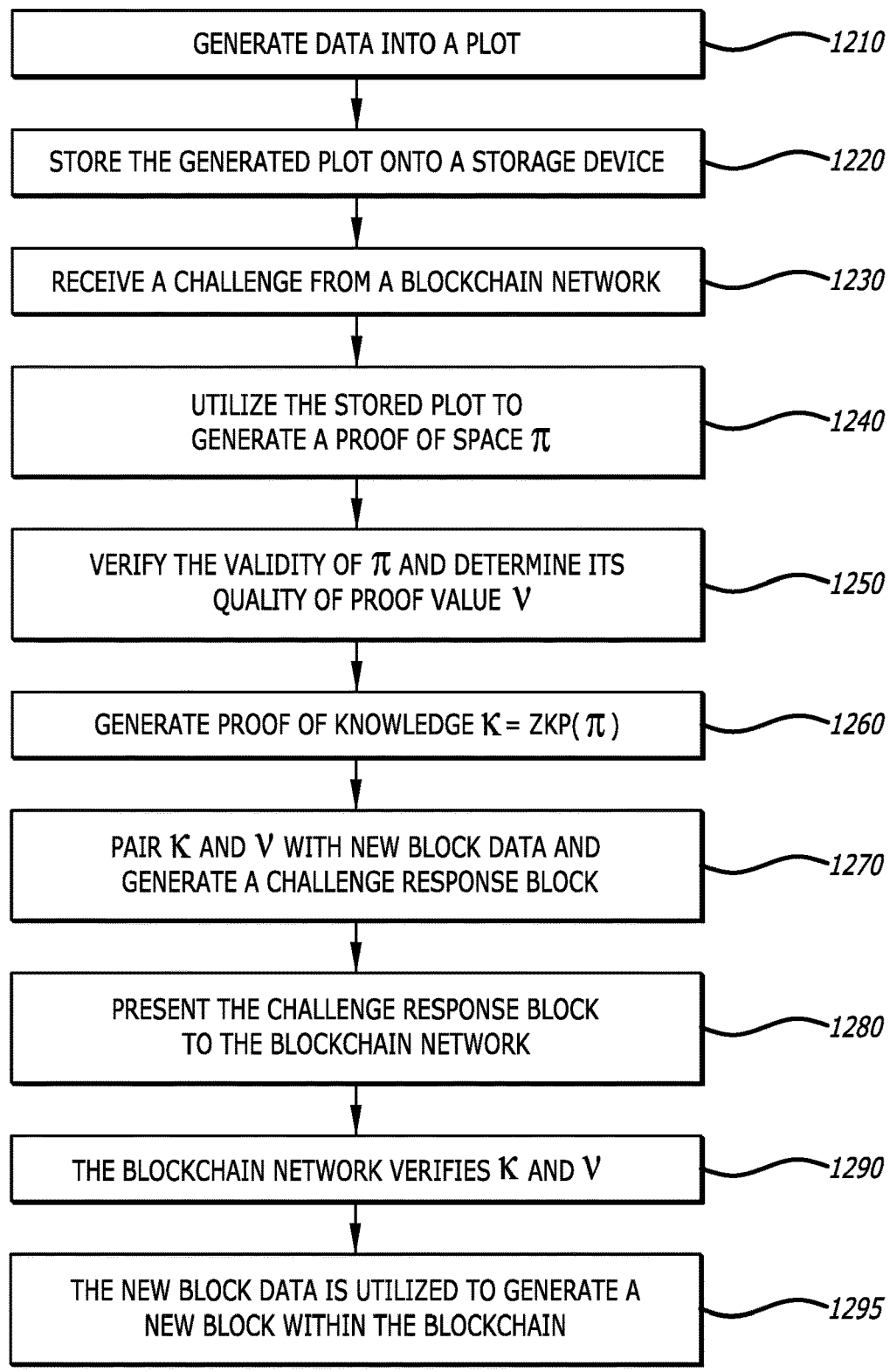
FIG. 12 is a flowchart illustrating a process of generating a challenge response block suitable for use in a proof-of-knowledge consensus blockchain processing in accordance with an embodiment of the disclosure.

Referring to FIG. 12, a flowchart illustrating a process 1200 of generating a challenge response block suitable for use in a proof-of-knowledge consensus blockchain processing in accordance with an embodiment of the disclosure is shown. Process 1200 may begin by generating data into a plot that is suitable for generating a proof-of-space for a blockchain (block 1210). This may be a Chia blockchain, though the inventive principles may apply to other blockchains. The plot may then be stored onto a storage device (block 1220). A challenge may be received from the blockchain network (block 1230), and the stored plot may be used to generate a proof-of-space π (block 1240).

The validity of PoS π may be verified, and the quality-of-proof value (QoPV) v may be determined (block 1250). Because PoS π will not be made available to the verifier, QoPV v may be calculated and included with the challenge response block. A zero-knowledge proof-of-knowledge κ=ZKP(π) may be generated (block 1260). PoK κ and QoPV v may be paired with new block data, and a challenge response block may be generated (block 1270), and the challenge response block may be presented to the blockchain network (block 1280). The blockchain network may verify PoK κ and QoP v (block 1290), and (if successfully verified) the new block data may be utilized to generate a new block within the blockchain (block 1295). In theory, a properly constructed proof-of-knowledge may be used to verify any statement to any verifier's (reasonable) satisfaction. In the case of process 1200, the statement is, "I have a PoS π with a QoPV of v."

Figure 13:
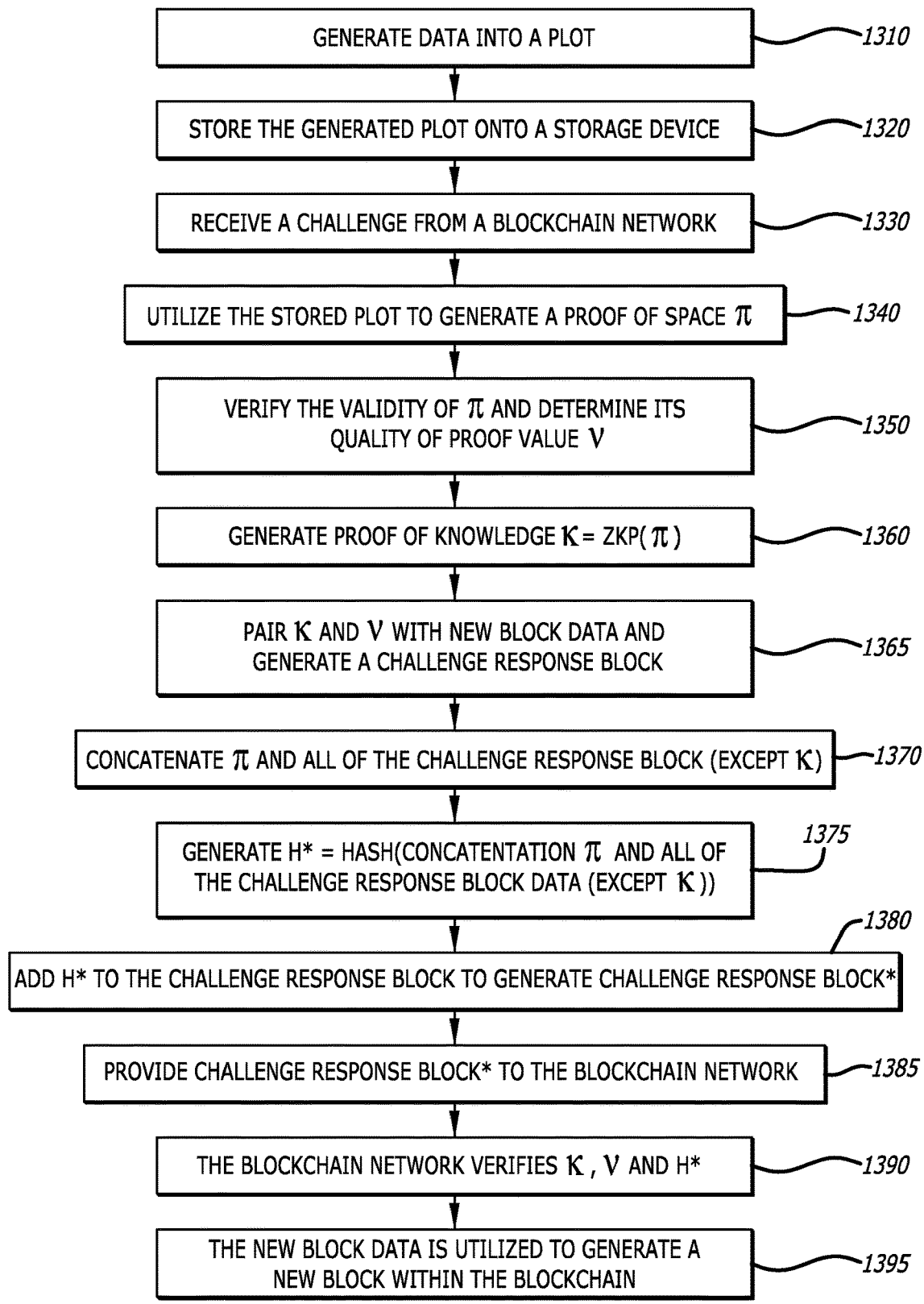
FIG. 13 is a flowchart illustrating a process of generating a challenge response block suitable for use in a proof-of-knowledge consensus blockchain processing in accordance with an embodiment of the disclosure.

Referring to FIG. 13, a flowchart illustrating a process 1300 of generating a challenge response block suitable for use in a proof-of-knowledge consensus blockchain processing in accordance with an embodiment of the disclosure is shown. Process 1300 may begin by generating data into a plot that is suitable for generating a proof-of-space for a blockchain (block 1310). This may be a Chia blockchain, though the principles may apply to other blockchains. The plot may then be stored onto a storage device (block 1320). A challenge may be received from the blockchain network (block 1330), and the stored plot may be used to generate a proof-of-space π (block 1340).

The validity of PoS π may be verified, and the quality-of-proof value v may be determined (block 1350). A proof-of-knowledge κ=ZKP(π) may be generated (block 1360), and PoK κ and v may be paired with new block data and a challenge response block BLOCK$^\dagger$ may be generated (block 1365). PoS π may be concatenated with the rest of BLOCK$^\backslash$ (except for PoK κ) (block 1370), and a hash H\*=HASH(PoS π, (BLOCK$^\dagger$−PoK κ)) of the concatenation may be generated (block 1375). The hash H\* may be added to BLOCK$^\dagger$ to generate challenge response block BLOCK\* (block 1380). BLOCK\* may be provided to the blockchain network (block 1385). The blockchain network may verify PoK γ, v, and H\* (block 1390), and (if successfully verified) the new block data may be utilized to generate a new block within the blockchain (block 1395). In theory, a properly constructed proof-of-knowledge may be used to verify any statement to any verifier's (reasonable) satisfaction. In the case of process 1300, the statement is, "I have a PoS π with a QoPV v, and the hash of PoS π concatenated with all of the block data (except PoK κ) is H\*." This effectively "signs" the entire challenger response block BLOCK\* with PoS π so no competing and verifiable block may be presented to the blockchain network utilizing stolen PoK κ.

It should be noted that no attempt is made here to discuss the underlying mathematics and principles of public/secret key encryption, zero-knowledge proofs, or any other cryptographic techniques used to implement blockchain networks to avoid overcomplicating the disclosure and obscuring the inventive principles contained herein. It is understood that persons skilled in the art will possess a working knowledge of the theory and practice thereof.

Figure 14:
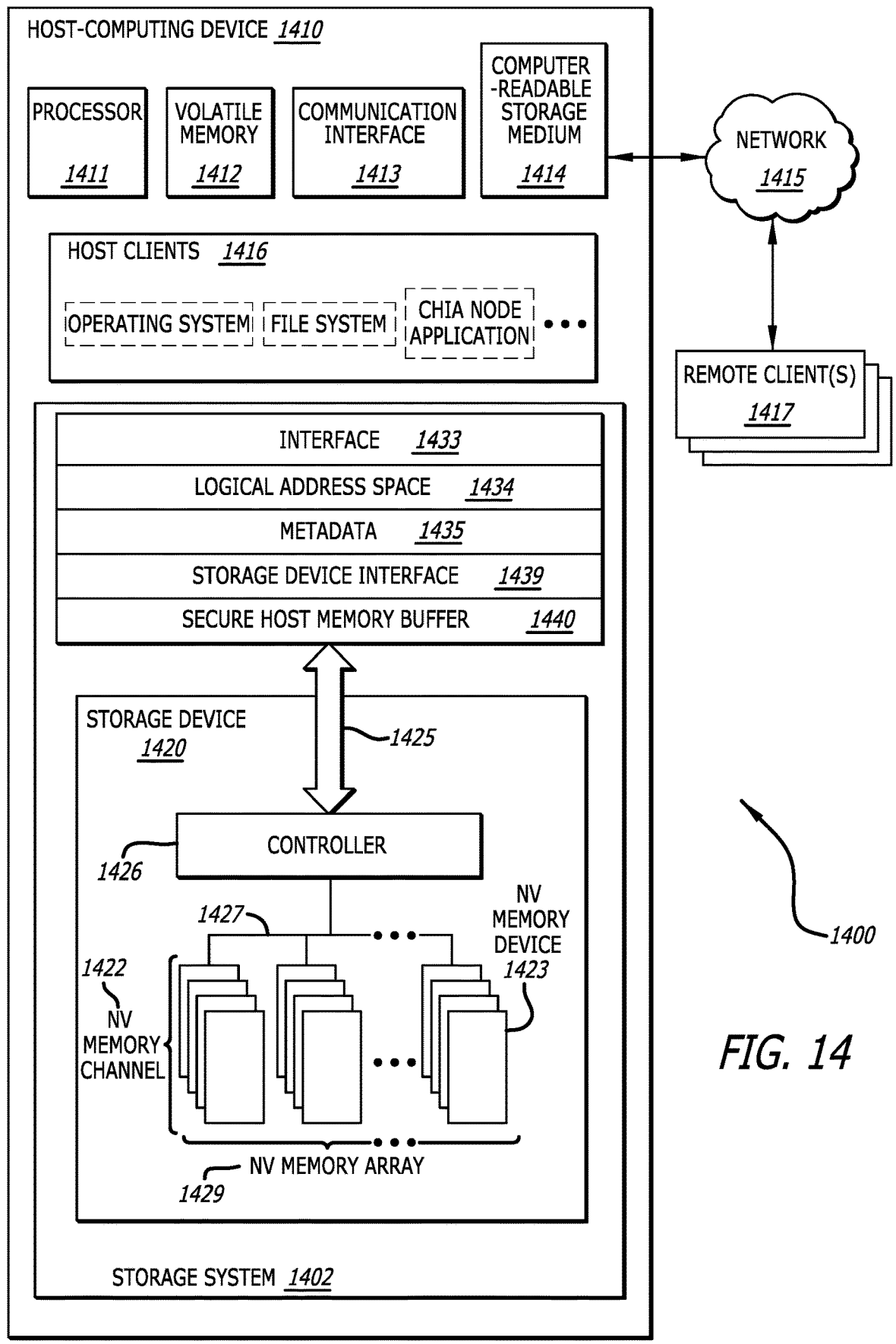
FIG. 14 is a schematic block diagram of a host-computing device suitable for use in a proof-of-knowledge consensus blockchain processing in accordance with an embodiment of the disclosure.

Referring to FIG. 14, a schematic block diagram of a host-computing device suitable for proof-of-space consensus blockchain processing in accordance with an embodiment of the disclosure is shown. The proof-of-space consensus blockchain system 1400 comprises one or more storage devices 1420 of a storage system 1402 within a host-computing device 1410 in communication via a controller 1426. The host-computing device 1410 may include a processor 1411, volatile memory 1412, and a communication interface 1413. The processor 1411 may include one or more central processing units, one or more general-purpose processors, one or more application-specific processors, one or more virtual processors (e.g., the host-computing device 1410 may be a virtual machine operating within a host), one or more processor cores, or the like. The communication interface 1413 may include one or more network interfaces configured to communicatively couple the host-computing device 1410 and/or controller 1426 of the storage device 1420 to a communication network such as an Internet Protocol (IP) network, a Storage Area Network (SAN), wireless network, wired network, or the like. The host-computing device 1410 may further comprise a computer-readable storage medium 1414. The computer-readable storage medium 1414 may comprise executable instructions configured to cause the host-computing device 1410 (e.g., processor 1411) to perform steps of one or more of the methods disclosed herein.

The storage device 1420, in various embodiments, may be disposed of in one or more different locations relative to the host-computing device 1410. In one embodiment, the storage device 1420 comprises one or more nonvolatile memory devices 1423, such as semiconductor chips or packages or other integrated circuit devices disposed on one or more printed circuit boards, storage housings, and/or other mechanical and/or electrical support structures. For example, the storage device 1420 may comprise one or more dual inline memory module (DIMM) cards, one or more expansion cards and/or daughter cards, a solid-state-drive (SSD) or other hard drive device, and/or may have another memory and/or storage form factor. The storage device 1420 may be integrated with and/or mounted on a motherboard of the host-computing device 1410, installed in a port and/or slot of the host-computing device 1410, installed on a different host-computing device 1410, and/or a dedicated storage appliance on the network 1415, in communication with the host-computing device 1410 over an external bus (e.g., an external hard drive), or the like.

The storage device 1420, in one embodiment, may be disposed on a memory bus of a processor 1411 (e.g., on the same memory bus as the volatile memory 1412, on a different memory bus from the volatile memory 1412, in place of the volatile memory 1412, or the like). In a further embodiment, the storage device 1420 may be disposed on a peripheral bus of the host-computing device 1410, such as a peripheral component interconnect express (PCI Express or PCIe) bus such, as but not limited to an NVM Express (NVMe) interface, a Serial Advanced Technology Attachment (SATA) bus, a Parallel Advanced Technology Attachment (PATA) bus, a Small Computer System Interface (SCSI) bus, a FireWire bus, a Fibre Channel connection, a Universal Serial Bus (USB), a PCIe Advanced Switching (PCIe-AS) bus, or the like. In another embodiment, the storage device 1420 may be disposed on a communication network 1415, such as an Ethernet network, an InfiniBand network, SCSI RDMA over a network 1415, a storage area network (SAN), a local area network (LAN), a wide area network (WAN) such as the Internet, another wired and/or wireless network 1415, or the like.

A device driver and/or the controller 1426, in certain embodiments, may present a logical address space 1434 to the host clients 1416. As used herein, a logical address space 1434 refers to a logical representation of memory resources. The logical address space 1434 may comprise a plurality (e.g., range) of logical addresses. As used herein, a logical address refers to any identifier for referencing a memory resource (e.g., data), including, but not limited to a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like. A device driver for the storage device 1420 may maintain metadata 1435, such as a logical to physical address mapping structure, to map logical addresses of the logical address space 1434 to media storage locations on the storage device(s) 1420. A device driver may be configured to provide storage services to one or more host clients 1416. The host clients 1416 may include local clients operating on the host-computing device 1410 and/or remote clients 1417 accessible via the network 1415 and/or communication interface 1413. The host clients 1416 may include but are not limited to: operating systems, file systems, database applications, server applications, kernel-level processes, user-level processes, applications, and the like. In many embodiments, the host client will be a proof-of-space blockchain logic that can make the host-computing device 1410 act as a node within a proof-of-space consensus blockchain network. The embodiments depicted in FIG. 14 may comprise a Chia node application host client. This embodiment may thus be configured to act as a Chia node on the Chia blockchain network.

In many embodiments, the host-computing device 1410 can include a plurality of virtual machines which may be instantiated or otherwise created based on user-request. As will be understood by those skilled in the art, a host-computing device 1410 may create a plurality of virtual machines configured as virtual hosts, which is limited only on the available computing resources and/or demand. A hypervisor can be available to create, run, and otherwise manage the plurality of virtual machines. Each virtual machine may include a plurality of virtual host clients similar to host clients 1416 that may utilize the storage system 1402 to store and access data.

The device driver may be further communicatively coupled to one or more storage systems 1402, which may include different types and configurations of storage devices 1420 including, but not limited to, solid-state storage devices, semiconductor storage devices, SAN storage resources, or the like. The one or more storage devices 1420 may comprise one or more respective controllers 1426 and nonvolatile memory channels 1422. The device driver may provide access to the one or more storage devices 1420 via any compatible protocols or interface 1433 such as, but not limited to, SATA and PCIe. The metadata 1435 may be used to manage and/or track data operations performed through the protocols or interfaces 1433. The logical address space 1434 may comprise a plurality of logical addresses, each corresponding to respective media locations of the one or more storage devices 1420. The device driver may maintain metadata 1435 comprising any-to-any mappings between logical addresses and media locations. As those skilled in the art will recognize, the number and location of the storage devices may change as needed. For example, in Chia node applications, the number of storage devices may increase as additional plots are created and set up for access during farming operations.

A device driver may further comprise and/or be in communication with a storage device interface 1439 configured to transfer data, commands, and/or queries to the one or more storage devices 1420 over a bus 1425, which may include, but is not limited to: a memory bus of a processor 1411, a peripheral component interconnect express (PCI Express or PCIe) bus, a Serial Advanced Technology Attachment (SATA) bus, a Parallel ATA (PATA) bus, a Small Computer System Interface (SCSI) bus, a FireWire bus, a Fibre Channel bus, a Universal Serial Bus (USB), a PCIe Advanced Switching (PCIe-AS) bus, a network 1415, an InfiniBand bus, a SCSI RDMA bus, or the like. The storage device interface 1439 may communicate with the one or more storage devices 1420 using input-output control (IO-CTL) command(s), IO-CTL command extension(s), remote direct memory access, or the like.

The storage system 1402 may further include a secure host memory buffer 1440. The secure host memory buffer 1440 may be configured to receive and store data from a storage device 1420. In this way, the secure host memory buffer 1440 can be configured as an external memory storage for the storage device 1420, which can be utilized for storing priority identifiers and their related protocols and/or data. In certain embodiments, the secure host memory buffer 1440 may be configured as a regular, non-secure memory buffer. In still further embodiments, the secure host memory buffer 1440 may be stored outside of the storage system 1402 and may be located within a different part of the host-computing device 1410. In still yet further embodiments, the secure host memory buffer 1440 may be located remotely as part of one or more remote clients 1417.

The communication interface 1413 may comprise one or more network interfaces configured to communicatively couple the host-computing device 1410 and/or the controller 1426 to a network 1415 and/or to one or more remote clients 1417 (which can act as another host). In many embodiments, the remote clients 1417 will be comprised of other proof-of-space consensus nodes within that respective blockchain network. For example, in the embodiment depicted in FIG. 14, the remote clients 117 may comprise other Chia nodes and/or timelords within the Chia network. The controller 1426 is part of and/or in communication with one or more storage devices 1420. Although FIG. 14 depicts a single storage device 1420, the disclosure is not limited in this regard and could be adapted to incorporate any number of storage devices 1420.

The storage device 1420 may comprise one or more nonvolatile memory devices 1423 of nonvolatile memory channels 1422, which may include but is not limited to ReRAM, Memristor memory, programmable metallization cell (PMC) memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, Silicon-Oxide-Nitride-Oxide-Silicon (SONOS), graphene memory, conductive-bridging RAM (CBRAM), magneto-resistive RAM (MRAM), magnetic storage media (e.g., hard disk, tape), optical storage media, or the like. The one or more nonvolatile memory devices 1423 of the nonvolatile memory channels 1422, in certain embodiments, may comprise storage class memory (SCM) (e.g., write-in-place memory, or the like).

While the nonvolatile memory channels 1422 is referred to herein as "memory media," in various embodiments, the nonvolatile memory channels 1422 may more generally comprise one or more nonvolatile recording media capable of recording data, which may be referred to as a nonvolatile memory medium, a nonvolatile memory device, or the like. Further, the storage device 1420, in various embodiments, may comprise a nonvolatile recording device, a nonvolatile memory array 1429, a plurality of interconnected storage devices in an array, or the like.

The nonvolatile memory channels 1422 may comprise one or more nonvolatile memory devices 1423, which may include, but are not limited to: chips, packages, planes, die, or the like. A controller 1426 may be configured to manage data operations on the nonvolatile memory channels 1422, and may comprise one or more processors, programmable processors (e.g., FPGAs), ASICs, microcontrollers, or the like. In some embodiments, controller 1426 is configured to store data on and/or read data from the nonvolatile memory channels 1422, to transfer data to/from the storage device 1420, and so on.

The controller 1426 may be communicatively coupled to the nonvolatile memory channels 1422 by way of a bus 1427. The bus 1427 may comprise an I/O bus for communicating data to/from the nonvolatile memory devices 1423. The bus 1427 may further comprise a control bus for communicating addressing and other command and control information to the nonvolatile memory devices 1423. In some embodiments, the bus 1427 may communicatively couple the nonvolatile memory devices 1423 to the controller 1426 in parallel. This parallel access may allow the nonvolatile memory devices 1423 to be managed as a group, forming a nonvolatile memory array 1429. The nonvolatile memory devices 1423 may be partitioned into respective logical memory units (e.g., logical pages) and/or logical memory divisions (e.g., logical blocks). The logical memory units may be formed by logically combining physical memory units of each of the nonvolatile memory devices 1423.

The controller 1426 may organize a block of word lines within a nonvolatile memory device 1423, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a nonvolatile memory device 1423 may be physically arranged in a monotonically increasing sequence of word line addresses, with consecutively addressed word lines also being physically adjacent (e.g., WL0, WL1, WL2, . . . WLN).

The controller 1426 may comprise and/or be in communication with a device driver executing on the host-computing device 1410. A device driver may provide storage services to the host clients 1416 via one or more interfaces 1433. A device driver may further comprise a storage device interface 1439 that is configured to transfer data, commands, and/or queries to the controller 1426 over a bus 1425, as described above.

Figure 15:
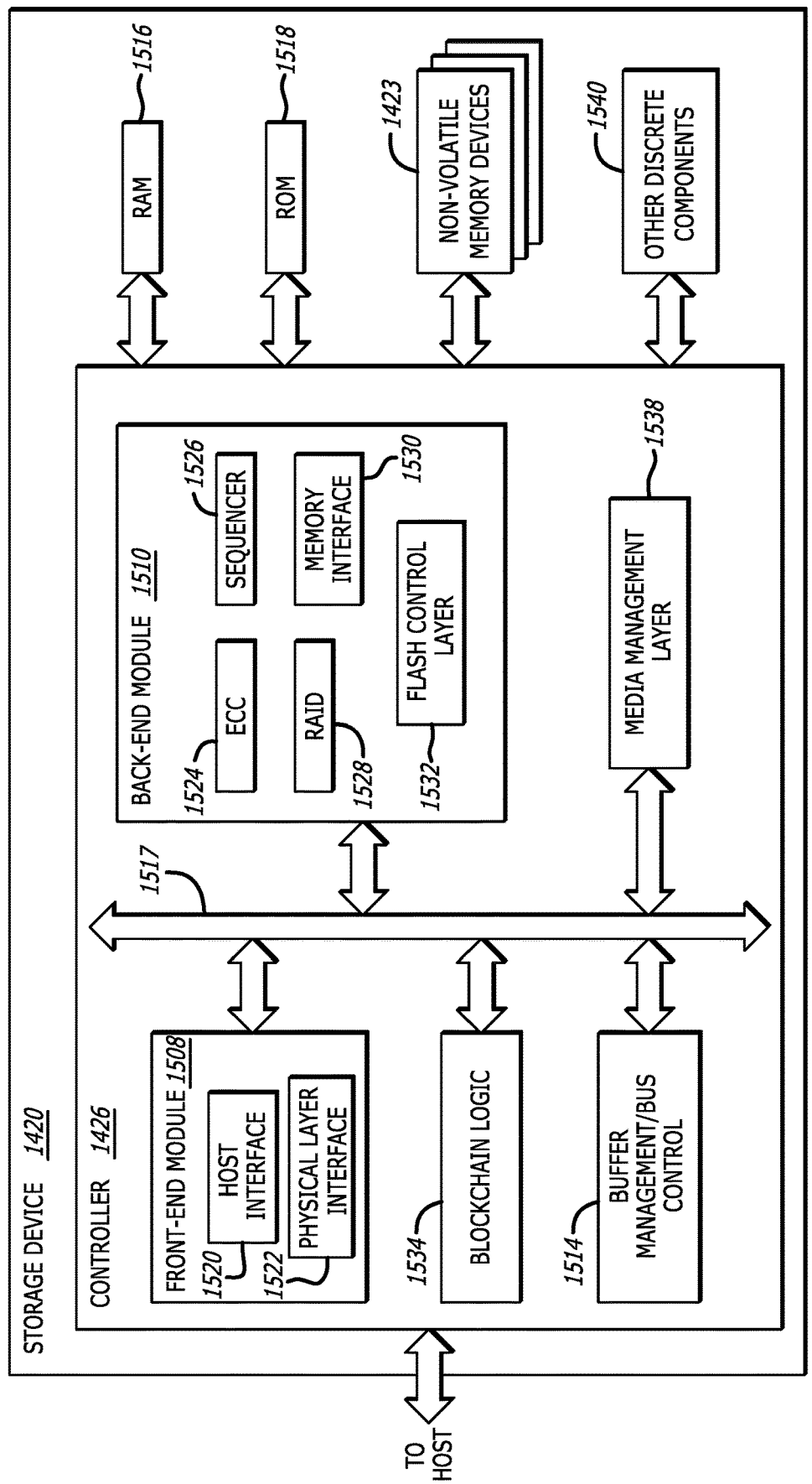
FIG. 15 is a schematic block diagram of a storage device suitable for proof-of-space consensus blockchain processing in accordance with an embodiment of the disclosure.

Referring to FIG. 15, a schematic block diagram of a storage device suitable for proof-of-space consensus blockchain processing in accordance with an embodiment of the disclosure is shown. The controller 1426 may include a front-end module 1508 that interfaces with a host via a plurality of high priority and low priority communication channels, a back-end module 1510 that interfaces with the nonvolatile memory devices 1423, and various other modules that perform various functions of the storage device 1420. In some embodiments, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 1426 may include a buffer management/bus control module 1514 that manages buffers in Random Access Memory (RAM) 1516 and controls the internal bus arbitration for communication on an internal communications bus 1517 of the controller 1426. A read only memory (ROM) 1518 may store and/or access system boot code. Although illustrated in FIG. 15 as located separately from the controller 1426, in other embodiments, one or both of the RAM 1516 and the ROM 1518 may be located within the controller 1426. In yet other embodiments, portions of RAM 1516 and ROM 1518 may be located both within controller 1426 and outside controller 1426. Further, in some implementations, the controller 1426, the RAM 1516, and the ROM 1518 may be located on separate semiconductor dies.

Additionally, the front-end module 1608 may include a host interface 1520 and a physical layer interface 1522 that provides the electrical interface with the host or next-level storage controller. The choice of the type of the host interface 1520 can depend on the type of memory being used. Embodiment types of the host interfaces 1520 may include, but are not limited to, SATA, SATA Express, SAS, Fibre Channel, USB, PCIe, and NVMe. The host interface 1520 may typically facilitate transfer for data, control signals, and timing signals.

The back-end module 1510 may include an error correction code (ECC) engine 1524 that encodes the data bytes received from the host and decodes and error corrects the data bytes read from the nonvolatile memory devices 1423. The back-end module 1510 may also include a command sequencer 1526 that generates command sequences, such as program, read, and erase command sequences, to be transmitted to the nonvolatile memory devices 1423. Additionally, the back-end module 1510 may include a RAID (Redundant Array of Independent Drives) module 1528 that manages the generation of RAID parity and recovery of failed data. The RAID parity may be used as an additional level of integrity protection for the data being written into the storage device 1420. In some embodiments, the RAID module 1528 may be a part of the ECC engine 1524. A memory interface 1530 provides the command sequences to the nonvolatile memory devices 1423 and receives status information from the nonvolatile memory devices 1423. Along with the command sequences and status information, data to be programmed into and read from the nonvolatile memory devices 1423 may be communicated through the memory interface 1530. A flash control layer 1532 may control the overall operation of back-end module 1510.

Additional modules of the storage device 1420 illustrated in FIG. 15 may include a media management layer 1538, which performs wear leveling of memory cells of the nonvolatile memory devices 1423. The storage device 1420 may also include other discrete components 1540, such as external electrical interfaces, external RAM, resistors, capacitors, or other components that may interface with controller 1426. In alternative embodiments, one or more of the RAID modules 1528, media management layer 1538, and buffer management/bus control module 1514 are optional components that may not be necessary in the controller 1426. In various embodiments, blockchain logic 1534 may be present.

Figure 16:
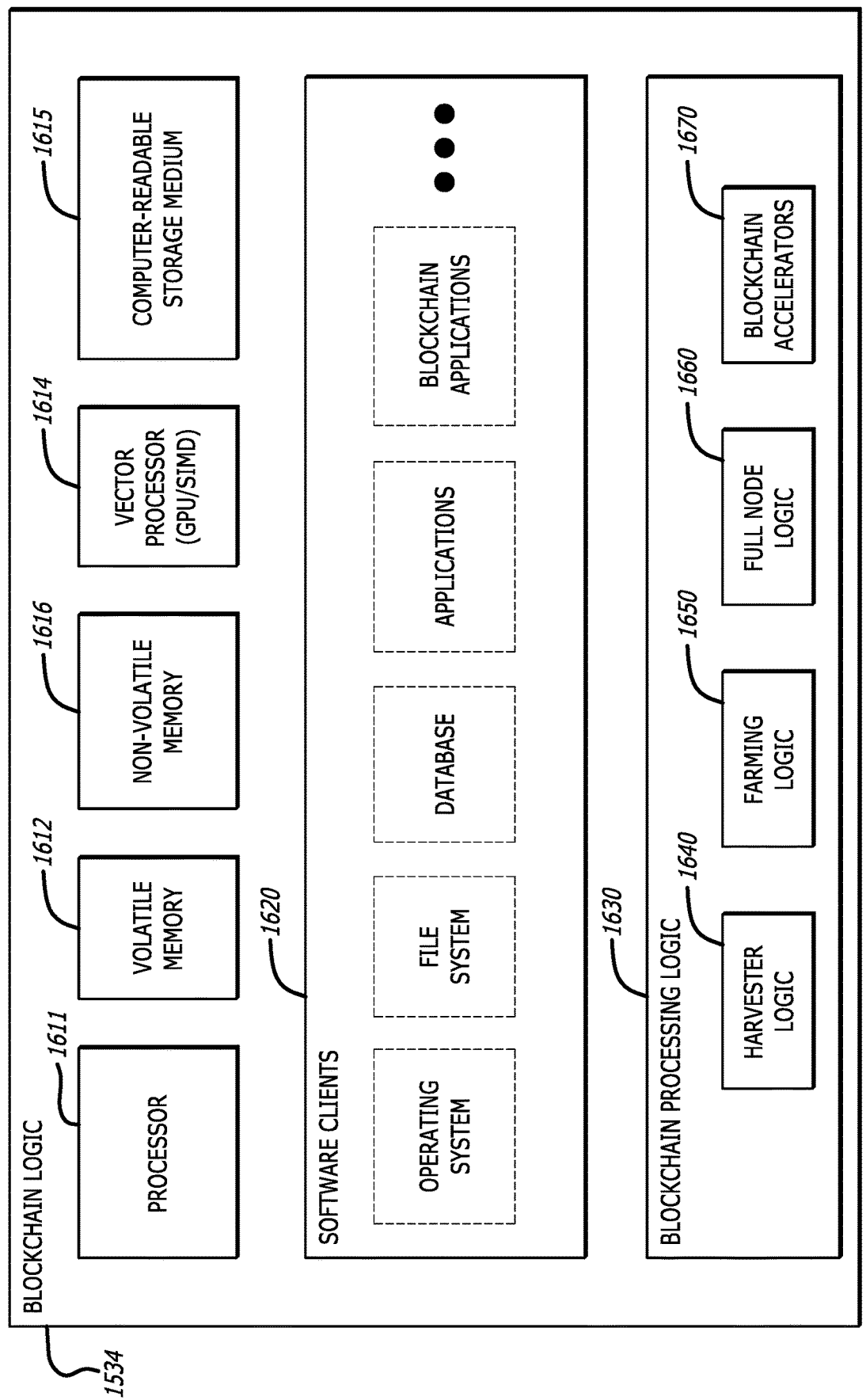
FIG. 16 is a schematic block diagram of a blockchain logic suitable for proof-of-space consensus blockchain processing in accordance with an embodiment of the disclosure.

Referring to FIG. 16, a schematic block diagram of a blockchain logic suitable for proof-of-space consensus blockchain processing in accordance with an embodiment of the disclosure is shown. Blockchain logic 1534 may comprise processor 1611, which may execute various control programs and applications such as software clients 1620. Such programs and applications may include an operating system, a file system, one or more databases, and a variety of applications, some of which may be blockchain applications.

Volatile memory 1612 may be used by processor 1611 for code execution, scratchpad memory, temporary storage of video data, and the like. Nonvolatile memory 1613 may be used by processor 1611 to store programs, data, and various software clients 1620. Optional vector processor 1614 may be used for high-speed parallel calculations. In some embodiments, vector processor 1614 may be implemented as part of the blockchain processing logic 1630. Vector processor 1614 may be a graphics processing unit (GPU)

and/or have a single instruction/multiple data (SIMD) processor architecture and be capable of operating on very long data words like, for example, 128-bits, 256-bits, 512-bits, 1024-bits, or even more in some embodiments. Computer-readable storage medium 1615 may be used by processor 1611 for program storage, data, and other purposes.

Blockchain processing logic 1630 may be either a hardware function, a software function, or a combination thereof. In various embodiment, blockchain logic 1630 may be responsible for controlling the various blockchain functions like, for example, harvester logic 1640, farming logic 1650, full node logic 1660, and blockchain accelerators 1670. Blockchain processing logic 1630 and its various component functions may be capable of operating an entire proof-of-space blockchain full node like, for example, a Chia full node as described above.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A method, comprising:
generating data into a plot;
storing the generated plot onto a storage device;
receiving a challenge from a blockchain network;
utilizing the stored plot to generate a proof-of-space;
verifying the validity of the proof-of-space;
determining the quality of the proof-of-space;
utilizing the proof-of-space to generate a proof-of-knowledge, wherein the proof-of-knowledge is a zero-knowledge proof generated by zk-SNARK; and
wherein the proof-of-knowledge, the quality of the proof-of-space, and new block data are combined to generate a challenge response block.

2. The method of claim 1, wherein: a blockchain network verifies the proof-of-knowledge and the quality of the proof-of-space in the challenge response block; and the blockchain network utilizes the new block data to generate a new block within the blockchain.

3. The method of claim 2, wherein the blockchain network is the Chia network.

4. The method of claim 1, further comprising:
generating a first hash of at least a portion of the new block data;
generating a second hash combining the first hash and the proof-of-space; and
combining the proof-of-knowledge, the quality of the proof-of-space, the second hash, and new block data to generate a challenge response block.

5. The method of claim 4, further comprising:
verifying the proof-of-knowledge, the quality of the proof-of-space, and the second hash in the challenge response block; and generating a new block within the blockchain.

6. The method of claim 5, wherein the blockchain network is the Chia network.

7. A blockchain network, comprising:
a prover system configured to:
generate data into a plot;
store the generated plot onto a storage device;
receive a challenge from a blockchain network;
utilize the stored plot to generate a proof-of-space;
verify the validity of the proof-of-space;
determine the quality of the proof-of-space;
utilize the proof-of-space to generate a proof-of-knowledge, wherein the proof-of-knowledge is a zero-knowledge proof generated by zk-SNARK;
and combine the proof-of-knowledge, the duality of the proof-of-space, and new block data to generate a challenge response block; and
a verifier system configured to:
verify the proof-of-knowledge and the quality of the proof-of-space in the challenge response block; and
utilize the new block data to generate a new block within the blockchain.

8. The blockchain network of claim 7, wherein: the prover system is further configured to: generate a first hash of at least a portion of the new block data;
generate a second hash combining the first hash and the proof-of-space;
and include the second hash into the challenge response block; and
the verifier system is further configured to: verify the second hash in the challenge response block.

9. The blockchain network of claim 7, wherein the blockchain network is the Chia network.

10. A device, comprising:
a memory; and
a blockchain logic configured to:
store a generated plot into the memory;
receive a challenge from a blockchain network;
utilize the stored plot to generate a proof-of-space;
verify the validity of the proof-of-space;
determine the quality of the proof-of-space;
utilize the proof-of-space to generate a proof-of-knowledge, wherein the proof-of-knowledge is a zero-knowledge proof generated by zk-SNARK;
and combine the proof-of-knowledge, the quality of the proof-of-space, and new block data to generate a challenge response block.

11. The device of claim 10, wherein: the blockchain logic is further configured to: generate a first hash of at least a portion of the new block data; generate a second hash combining the first hash and the proof-of-space; and combine the proof-of-knowledge, the quality of the proof-of-space, the second hash, and new block data to generate a challenge response block.

12. The device of claim 10, wherein the blockchain logic is configured to be compatible with the Chia network.

\* \* \* \* \*